United States Patent
Igarashi et al.

(10) Patent No.: US 9,872,215 B2
(45) Date of Patent: Jan. 16, 2018

(54) COMMUNICATION CONTROL DEVICE, COMMUNICATION CONTROL METHOD, TERMINAL DEVICE, DATA RECEIVING METHOD, ACCESS POINT AND PROGRAM

(71) Applicant: SONY CORPORATION, Tokyo (JP)

(72) Inventors: Tatsuya Igarashi, Tokyo (JP); Katsutoshi Itoh, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 48 days.

(21) Appl. No.: 14/768,814

(22) PCT Filed: Mar. 25, 2014

(86) PCT No.: PCT/JP2014/058268
§ 371 (c)(1),
(2) Date: Aug. 19, 2015

(87) PCT Pub. No.: WO2014/181595
PCT Pub. Date: Nov. 13, 2014

(65) Prior Publication Data
US 2016/0066226 A1    Mar. 3, 2016

(30) Foreign Application Priority Data
May 7, 2013 (JP) ................. 2013-097348

(51) Int. Cl.
*H04W 80/04* (2009.01)
*H04W 36/08* (2009.01)
*H04W 16/12* (2009.01)
*H04L 29/06* (2006.01)
*H04L 29/12* (2006.01)
*H04W 72/04* (2009.01)
(Continued)

(52) U.S. Cl.
CPC ......... *H04W 36/08* (2013.01); *H04L 61/2007* (2013.01); *H04L 61/2069* (2013.01); *H04L 65/4076* (2013.01); *H04W 16/12* (2013.01); *H04W 36/18* (2013.01); *H04W 72/0446* (2013.01); *H04W 84/12* (2013.01)

(58) Field of Classification Search
CPC . H04W 80/04; H04W 36/18; H04W 36/0011; H04W 36/14; H04W 36/08
See application file for complete search history.

(56) References Cited

U.S. PATENT DOCUMENTS 6,295,285 B1 *  9/2001  Whitehead ............ H04W 16/02
                                                            370/245
6,553,013 B1 *  4/2003  Jones ........................ G01S 5/14
                                                            340/10.1

(Continued)

*Primary Examiner* — Hassan Phillips
*Assistant Examiner* — Prenell Jones
(74) *Attorney, Agent, or Firm* — Chip Law Group

(57) ABSTRACT

[Object] To provide a mechanism that enables a terminal device to receive streaming data stably and that can be more easily implemented.
[Solution] Provided is a communication control device including: a control unit configured to cause each of segments included in streaming data to be delivered to one or more terminal devices in an area including a plurality of overlapping cells to be delivered from a first access point of a first cell in a first time slot and to be delivered from a second access point of a second cell overlapping the first cell in a second time slot different from the first time slot.

19 Claims, 15 Drawing Sheets

(51) Int. Cl.
*H04W 36/18* (2009.01)
*H04W 84/12* (2009.01)

(56) References Cited

U.S. PATENT DOCUMENTS

| | | | | |
|---|---|---|---|---|
| 6,813,285 B2* | 11/2004 | Peterson | ............... | H01S 3/0627 |
| | | | | 372/10 |
| 2003/0129984 A1* | 7/2003 | Dent | ....................... | H04B 1/715 |
| | | | | 455/446 |
| 2004/0081121 A1* | 4/2004 | Xu | ....................... | H04B 1/7097 |
| | | | | 370/329 |
| 2012/0243488 A1* | 9/2012 | Gupta | ............... | H04W 72/0426 |
| | | | | 370/329 |
| 2014/0152832 A1* | 6/2014 | Goldfeder | .......... | H04N 21/8549 |
| | | | | 348/157 |
| 2016/0073429 A1* | 3/2016 | Oteri | ................ | H04W 74/0816 |
| | | | | 370/338 |

* cited by examiner

| Color | Time Slot | Multicast Address | Frequency Channel |
|---|---|---|---|
| C1 | T1 | 239.192.50.1 | F1 |
| C2 | | | F2 |
| C3 | T2 | 239.192.50.2 | F1 |
| C4 | | | F2 |

SLOT CONFIGURATION DATA

| Color | Time Slot | Multicast Address | Frequency Channel |
|---|---|---|---|
| C1 | T1 | 239.192.50.1 | F1 |
| C2 | T2 | 239.192.50.2 | F1 |
| C3 | T3 | 239.192.50.3 | F1 |

SLOT CONFIGURATION DATA

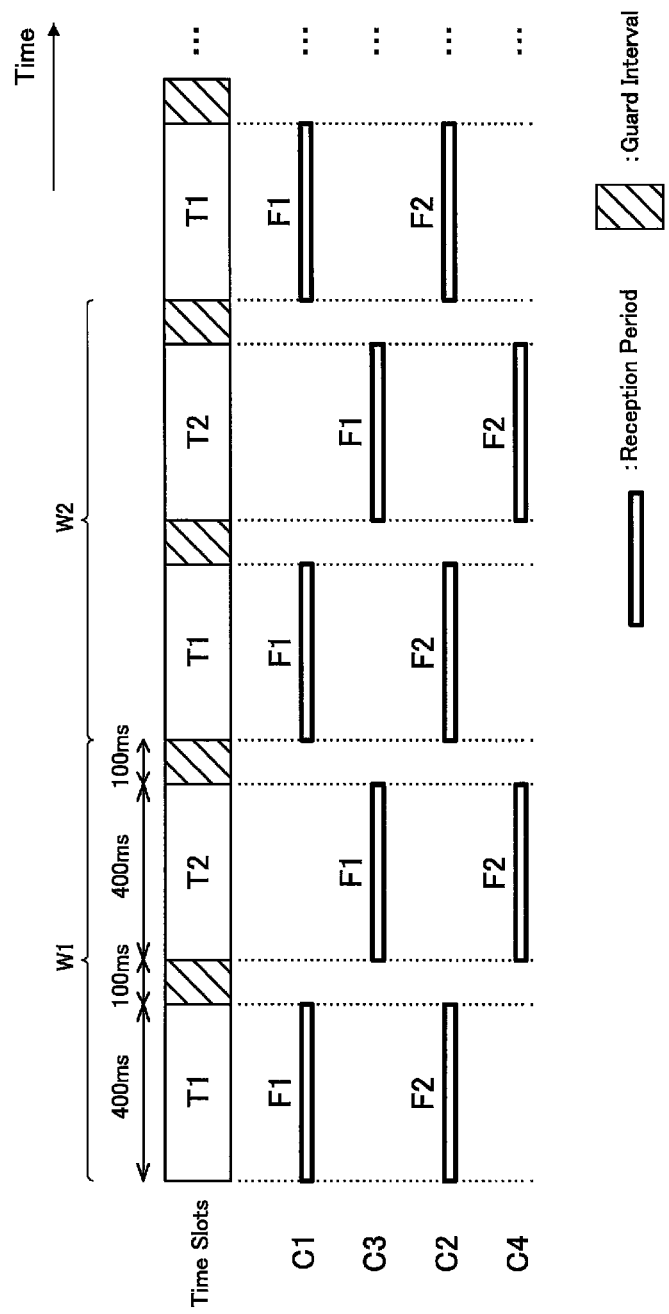

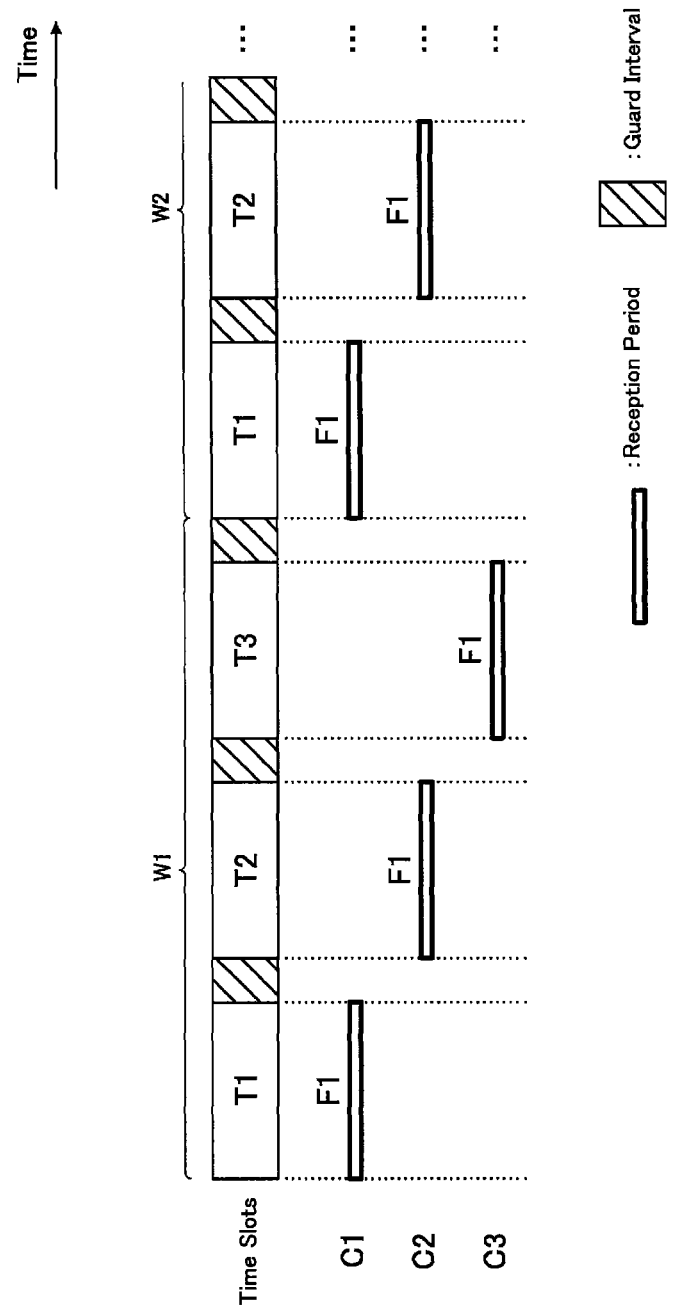

COMMUNICATION CONTROL DEVICE, COMMUNICATION CONTROL METHOD, TERMINAL DEVICE, DATA RECEIVING METHOD, ACCESS POINT AND PROGRAM

TECHNICAL FIELD

The present disclosure relates to a communication control device, a communication control method, a terminal device, a data receiving method, an access point, and a program.

BACKGROUND ART

In recent wireless communication services, streaming data conveying content such as a video or a sound occupies most of traffic. When a terminal device that receives streaming data moves, it is important not to interfere with seamless reproduction of content.

In a common cellular communication scheme, a plurality of cells are arranged to overlap each other in a service area of a wide range. The terminal device can continuously receive the streaming data while switching a cell of a connection destination in the service area by a handover procedure. For example, interference between overlapping cells can be prevented by using different frequency channels.

Even in a wireless Local Area Network (LAN) scheme standardized in the IEEE 802.11 series, a plurality of cells allocated the same Service Set Identifier (SSID) are arranged to overlap each other, and it is possible to allow the terminal device to roam between neighboring cells. However, when a band allocated to a system does not have a sufficient number of frequency channels, it may be difficult to prevent interference by allocating a different frequency channel to a neighboring cell. Non-Patent Literature 1 discloses a technique standardized in IEEE 802.11aa for streaming video content stably in the wireless LAN scheme.

CITATION LIST

Non-Patent Literature

Non-Patent Literature 1: "IEEE 802.11aa: Improvements on video transmission over Wireless LANs," [online], [searched on Apr. 15, 2013], the Internet <http://www-mobile.ecs.soton.ac.uk/home/conference/ICC2012/symposia/papers/ieee_802_11aa_improvements_on_video_transmission_over_.pdf>

SUMMARY OF INVENTION

Technical Problem

However, the technique standardized in IEEE 802.11aa is complicated, and a large cost is necessary in implementing the technique in a system.

In this regard, it is desirable to provide a mechanism that enables the terminal device to receive streaming data stably and that can be more easily implemented.

Solution to Problem

According to the present disclosure, there is provided a communication control device including: a control unit configured to cause each of segments included in streaming data to be delivered to one or more terminal devices in an area including a plurality of overlapping cells to be delivered from a first access point of a first cell in a first time slot and to be delivered from a second access point of a second cell overlapping the first cell in a second time slot different from the first time slot.

According to the present disclosure, there is provided a communication control method including: causing each of segments included in streaming data to be delivered to one or more terminal devices in an area including a plurality of overlapping cells to be delivered from a first access point of a first cell in a first time slot; and causing each of the segments to be delivered from a second access point of a second cell overlapping the first cell in a second time slot different from the first time slot.

According to the present disclosure, there is provided a program causing a computer that controls a communication control device to operates as: a control unit configured to cause each of segments included in streaming data to be delivered to one or more terminal devices in an area including a plurality of overlapping cells to be delivered from a first access point of a first cell in a first time slot and to be delivered from a second access point of a second cell overlapping the first cell in a second time slot different from the first time slot.

According to the present disclosure, there is provided a terminal device including: a wireless communication unit configured to receive each of segments included in streaming data from an access point in a first time slot in a time window including the first time slot and a second time slot; and a control unit configured to cause the wireless communication unit to sleep at least partially in the second time slot in which the segment is not received from the access point.

According to the present disclosure, there is provided a data receiving method including: receiving, in a terminal device, each of segments included in streaming data from an access point in a first time slot in a time window including the first time slot and a second time slot; and causing a wireless communication unit of the terminal device to sleep at least partially in the second time slot in which the segment is not received from the access point.

According to the present disclosure, there is provided a program causing a computer that controls a terminal device including a wireless communication unit to function as: a control unit configured to cause the wireless communication unit to receive each of segments included in streaming data from an access point in a first time slot in a time window including the first time slot and a second time slot and cause the wireless communication unit to sleep at least partially in the second time slot in which the segment is not received from the access point.

According to the present disclosure, there is provided an access point that provides a wireless communication service to a terminal device in a first cell, the access point including: a wireless communication unit configured to deliver each of segments included in streaming data to the terminal device; and a control unit configured to cause the wireless communication unit to deliver each segment to the terminal device in a time slot different from a time slot in which each segment is delivered in a second cell overlapping the first cell.

Advantageous Effects of Invention

According to the technique according to the present disclosure, it is possible to easily implement a mechanism that enables a terminal device to receive streaming data stably.

BRIEF DESCRIPTION OF DRAWINGS

FIG. 3A is an explanatory diagram illustrating a first example of slot configuration data.

FIG. 3B is an explanatory diagram illustrating a second example of slot configuration data.

FIG. 4A is an explanatory diagram for describing a slot configuration corresponding to the slot configuration data illustrated in FIG. 3A.

FIG. 4B is an explanatory diagram for describing a slot configuration corresponding to the slot configuration data illustrated in FIG. 3B.

DESCRIPTION OF EMBODIMENTS

Hereinafter, (a) preferred embodiment(s) of the present disclosure will be described in detail with reference to the appended drawings. Note that, in this specification and the drawings, elements that have substantially the same function and structure are denoted with the same reference signs, and repeated explanation is omitted.

The description will proceed in the following order.

1. Overview of system
2. Exemplary configuration of data delivery server
2-1. Configuration of device
2-2. Delivery of plurality of pieces of streaming data
2-3. Redundant transmission of segment
2-4. Exemplary implementation
2-5. Process flow
3. Exemplary configuration of wireless access point
3-1. Configuration of device
3-2. Process flow
4. Exemplary configuration of terminal device
4-1. Configuration of device
4-2. Process flow
5. Modified example
6. Conclusion

1. OVERVIEW OF SYSTEM

Figure 1:
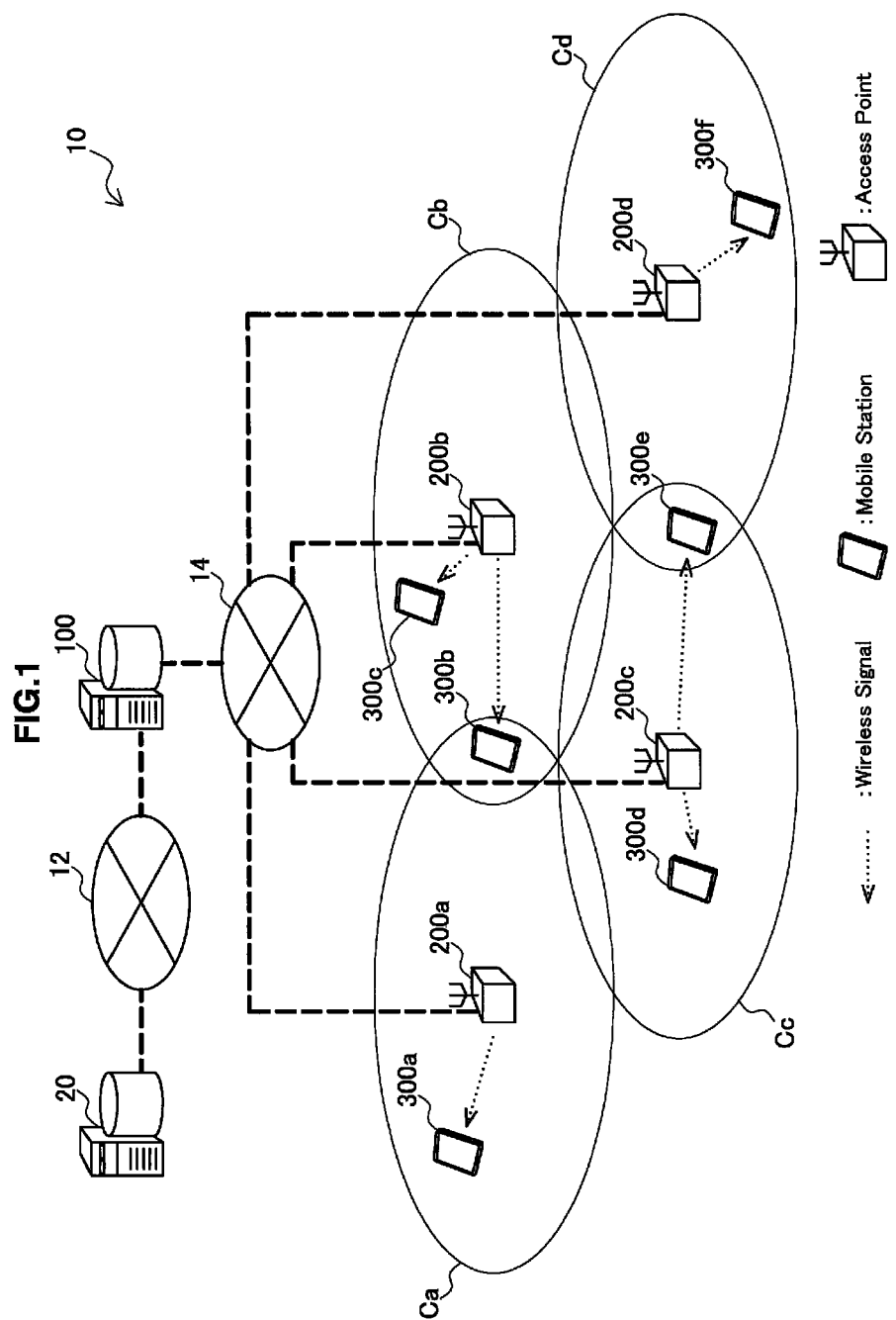
FIG. 1 is an explanatory diagram for describing an overview of a data delivery system according to an embodiment.

FIG. 1 is an explanatory diagram for describing an overview of a data delivery system according to an embodiment. Referring to FIG. 1, a data delivery system 10 includes the content server 20, the data delivery server 100, wireless access points (wireless APs) 200a to 200d, and terminal devices 300a to 300f. The number of wireless APs and the number of terminal devices illustrated in FIG. 1 are merely an example. In other words, the data delivery system 10 may include more or fewer wireless APs. Further, the data delivery system 10 may include more or fewer terminal devices.

The content server 20 is a data server that stores streaming data of content to be delivered to the terminal device. For example, data stored by the content server 20 may be streaming data for video content, audio content, or multimedia content including both a video and a sound.

The data delivery server 100 is a communication control device that controls delivery of streaming data to the terminal device through the wireless AP. In the example of FIG. 1, the data delivery server 100 is connected with the content server 20 via a network 12. The data delivery server 100 is not limited to the example of FIG. 1, and the data delivery server 100 may be implemented on the same server as the content server 20. The data delivery server 100 is connected with the wireless APs 200a to 200d via a network 14. The network 12 and the network 14 may be any type of network such as the Internet, an IP-VPN, or a LAN. The network 12 and the network 14 may be the same network. The data delivery server 100 transfers the streaming data acquired from the content server 20 to the wireless APs 200a to 200d. Instead of acquiring the streaming data from the content server 20, for example, the data delivery server 100 may convert a broadcast signal (of content such as a television program) received from a broadcasting station into streaming data and transfer the converted streaming data to the wireless APs 200a to 200d.

The wireless APs 200a to 200d are access points (or wireless base stations) that provide a wireless communication service to the terminal device. In the present embodiment, the wireless APs 200a to 200d operate according to the wireless LAN scheme such as IEEE 802.11a, 11b, 11g, or 11n. In another embodiment, the wireless APs 200a to 200d may operate according to a cellular communication scheme such as Long Term Evolution (LTE), LTE-Advanced (LTE-A), or WiMAX or may operate according to any other type of wireless communication scheme. The wireless AP 200a includes a cell (which is also referred to as a basic service set (BSS)) Ca. The wireless AP 200b includes a cell Cb. The wireless AP 200c includes a cell Cc. The wireless AP 200d includes a cell Cd. A service area of the data delivery system 10 is formed by the cells Ca to Cd. The wireless APs 200a to 200d deliver the streaming data transferred from the data delivery server 100 to one or more terminal devices in the service area.

The terminal devices 300a to 300f are mobile terminals that perform wireless communication using a wireless connection provided by the wireless APs 200a to 200d. The terminal devices 300a to 300f may be arbitrary types of mobile terminals such as smart phones, personal computers (PCs), personal digital assistants (PDAs), portable navigation devices (PNDs), or game terminals. For example, the terminal device 300a is positioned in the cell Ca operated by the wireless AP 200a and connected with the wireless AP 200a. Thus, the terminal device 300a can receive the streaming data delivered by the wireless AP 200a. When the terminal device 300a has moved into the cell Cb, the terminal device 300a switches a connection destination to the wireless AP 200b through a handover (also referred to as roaming) procedure. After switching the connection destination, the terminal device 300a can receive the streaming data delivered by the wireless AP 200b.

In the example of FIG. 1, the cell Ca overlaps the cell Cb and the cell Cc geographically. The cell Cb overlaps the cell Ca, the cell Cc, and the cell Cd geographically. The cell Cc overlaps the cell Ca, the cell Cb, and the cell Cd geographically. The cell Cd overlaps the cell Cb and the cell Cc geographically. When the cells are the BSSs of the wireless LAN scheme, the cells Ca, Cb, Cc, and Cd configure overlapping basic service sets (OBSS). It is important to arrange the cells in the overlapping manner as described above for consecutive provision of wireless communication service to the terminal device. However, when data is broadcast or multicast simultaneously in the service area, loss of data may occur in an area in which the neighboring cells overlap due to signal interference. In streaming data, loss of data leads to deterioration in reproduction quality of content experienced by the user, and it is difficult to recover deterioration in reproduction quality by retransmission.

In a typical technique, interference between neighboring cells is prevented by neighboring cells using different frequency channels. However, there are often cases in which the number of frequency channels usable by a system is insufficient, and it is difficult to allocate different frequency channels to overlapping cells. For example, a 2.4 GHz band and a 5 GHz band allocated in the IEEE 802.11 series do not have a sufficient number of frequency channels. For example, 13 channels, that is, channel numbers Ch1 to Ch13, are defined in IEEE 802.11g, but in order to prevent radio wave interference, it is necessary to provide channel spacing corresponding to a certain number of channels (for example, 5 channels). For this reason, a maximum of the number of channels that can be actually used at the same time is 3 (for example, the channels Ch1, Ch7, and Ch13).

An example of a more advanced technique for avoiding the prevention between neighboring cells is an evolved Multimedia Broadcast and Multicast Service (eMBMS) technique standardized by the 3GPP. The eMBMS technique prevents inter-cell interference and improves reception quality at a cell edge such that neighboring cells transmit the same data at the same timing through the same frequency channel. However, in the eMBMS technique, for example, it is necessary to perform fine control such that a plurality of wireless base stations are strictly synchronized in terms of time in a layer below the MAC layer.

As another example, a technique of performing admission control and scheduling among a plurality of cells in a collaborative manner in order to perform stable streaming of video content in an overlapping BSS environment is defined in IEEE 802.11aa. However, the technique defined in IEEE 802.11aa is complicated and thus high in an implementation cost, and a solution of applying this technique to many existing wireless APs is impractical.

In this regard, a mechanism that enables the terminal device to receive the streaming data stably in the data delivery system 10 and can be more easily implemented will be described in detail in this specification.

In the following description, when it is unnecessary to distinguish the wireless APs 200a to 200d from one another, letters at the ends of the reference numerals are omitted, and the wireless APs 200a to 200d are referred to collectively as a "wireless AP 200." Similarly, the terminal devices 300a to 300f are referred to collectively as a "terminal device 300." The same applies to reference numerals of other elements.

2. EXEMPLARY CONFIGURATION OF DATA DELIVERY SERVER

[2-1. Configuration of Device]

Figure 2:
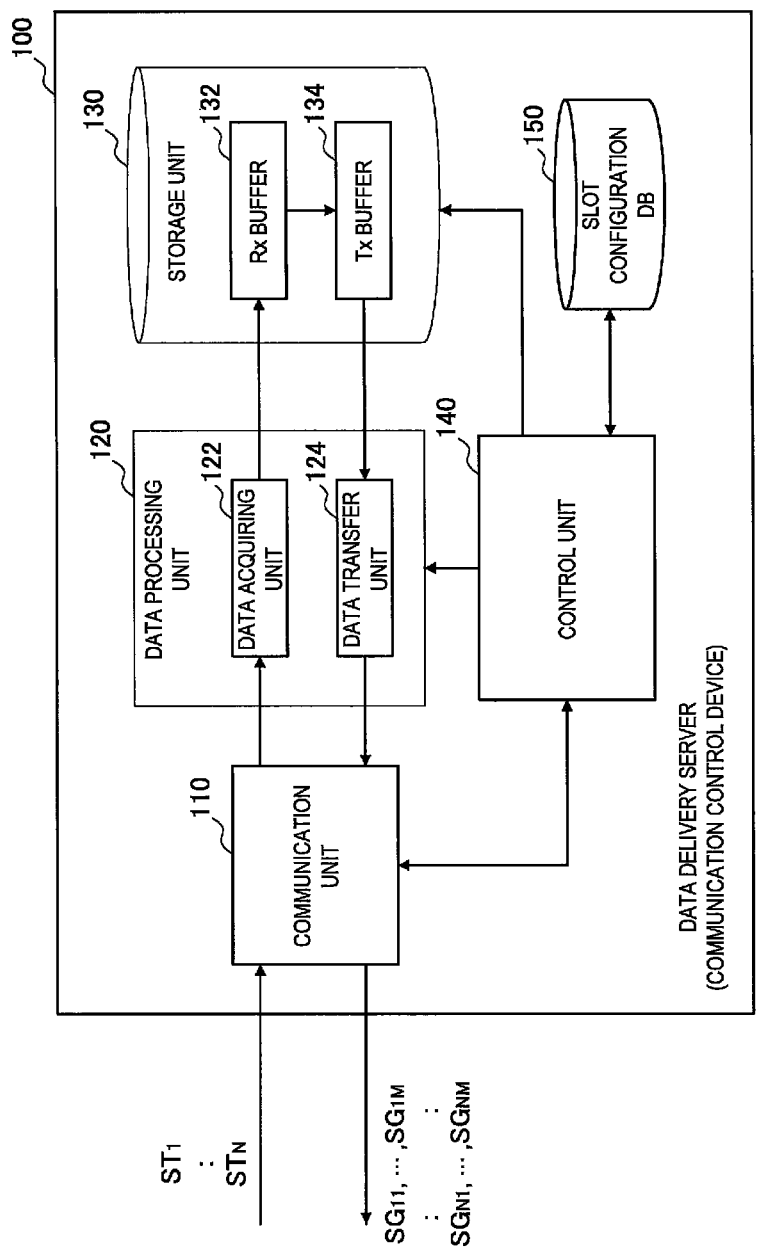
FIG. 2 is a block diagram illustrating an exemplary configuration of a data delivery server according to an embodiment.

FIG. 2 is a block diagram illustrating an exemplary configuration of the data delivery server 100 according to an embodiment. Referring to FIG. 2, the data delivery server 100 includes a communication unit 110, a data processing unit 120, a storage unit 130, a control unit 140, and a slot configuration database (DB) 150.

(1) Communication Unit

The communication unit 110 is a communication interface used when the data delivery server 100 performs communication with another device via the network 12 and the network 14. The communication unit 110 may be a wired communication interface or a wireless communication interface. For example, the communication unit 110 receives streaming data of content that is delivered from the content server 20 to the terminal device. The communication unit 110 transmits each of segments included in the streaming data to the wireless AP 200 according to control by the control unit 140 which will be described later.

(2) Data Processing Unit

The data processing unit 120 processes data packets received or transmitted through the communication unit 110. In the present embodiment, the data processing unit 120 includes a data acquiring unit 122 and a data transfer unit 124.

The data acquiring unit 122 acquires streaming data that is delivered to one or more terminal devices in the service area of the data delivery system 10 from the content server 20. The streaming data acquired by the data acquiring unit 122 may be, for example, data for video content, audio content, or multimedia content including both a video and a sound. The data acquiring unit 122 may acquire streaming data of a television program by converting a data format of a broadcast signal received from a television broadcasting station. For example, the data acquiring unit 122 acquires streaming data $ST_1$ to $ST_N$ for N (N≥1) content services in parallel. Then, the data acquiring unit 122 stores the acquired streaming data in a receiving (Rx) buffer 132.

A header is added to each of the segments of the streaming data stored in the receiving buffer 132, and the resultant streaming data is transferred to a transmitting (Tx) buffer 134. In the present embodiment, individual parts of a series obtained by dividing the streaming data on a time axis are referred to as segments. The data transfer unit 124 transfers segment data stored in the transmitting buffer 134 to each wireless AP 200 through the communication unit 110 at a timing designated by the control unit 140.

The data transfer unit 124 adds a time stamp acquired from a reference clock (not illustrated) to each piece of the segment data to be transferred. Here, the added time stamp indicates a transmission timing of each of the segments and may be used by the terminal device so that a segment delivery period is recognized.

(3) Storage Unit

The storage unit 130 includes the receiving buffer 132 and the transmitting buffer 134.

The receiving buffer 132 buffers the streaming data acquired by the data acquiring unit 122. The receiving buffer 132 may include a plurality of queues, each of which buffers the streaming data of a plurality of content services. The streaming data buffered by the receiving buffer 132 is copied to the transmitting buffer 134 after the header is added to each segment. The copying of the segment from the receiving buffer 132 to the transmitting buffer 134 may be executed each time a certain amount of data (for example, streaming data corresponding to one second) is accumulated. Each segment of the streaming data buffered by the receiving buffer 132 may be deleted after a plurality of pieces of corresponding segment data are stored in the transmitting buffer 134.

The transmitting buffer 134 buffers the segment data that is transferred to the wireless AP 200 through the data transfer unit 124. The transmitting buffer 134 may include a plurality of queues, each of which buffers the segment data of a plurality of content services. Each piece of segment data includes one of segments configuring the streaming data and a header. In the present embodiment, a plurality of pieces of segment data may be generated for one segment. In an embodiment, a plurality of pieces of segment data have different destination IP addresses and are transferred in different time slots through the data transfer unit 124. Each piece of segment data buffered by the transmitting buffer 134 may be deleted after the corresponding segment data is transferred by the data transfer unit 124.

(4) Control Unit

The control unit 140 controls delivery of the streaming data by the data delivery server 100. The streaming data is delivered to one or more terminal devices in the service area of the data delivery system 10 through a plurality of wireless APs 200. The service area of the data delivery system 10 includes a plurality of cells overlapping each other as illustrated in FIG. 1. In this regard, in the present embodiment, the control unit 140 controls the data transfer unit 124 such that the respective segments of the streaming data are transferred to a plurality of wireless APs 200 that use the same frequency channel and include cells overlapping each other in different time slots.

For example, the wireless AP 200a having the cell Ca and the wireless AP 200b having the cell Cb are assumed to use the same frequency channel. In this case, the control unit 140 causes the respective segments to be transferred to the wireless AP 200a in a first time slot, and causes the respective segments to be transferred to the wireless AP 200b in a second time slot different from the first time slot. Here, the first time slot and the second time slot are two different time slots among a plurality of time slots in one time window. The wireless AP 200a and the wireless AP 200b are set to relay each piece of segment data received from the data delivery server 100 to the terminal devices in the cell Ca and the cell Cb without substantial time delay. For example, when a delivery traffic indication message (DTIM) function in the wireless LAN scheme is valid, traffic having arrived at the wireless AP is first buffered and then delivered to the terminal device after a message exchange with the terminal device is performed. The control unit 140 may cause such a traffic notification message function for the terminal device 300 that receives the streaming data to be disabled in each wireless AP 200. As a result, each piece of segment data transferred from the data delivery server 100 to each wireless AP 200 is delivered from each wireless AP 200 to the terminal device 300 immediately without undergoing a message exchange accompanied with a delay.

In an embodiment, the control unit 140 may use an IP address filtering function included in each wireless AP 200. The IP address filtering function is a function of the wireless AP of relaying only packets having a certain destination IP address to a wireless link. For example, the control unit 140 allocates a common multicast address to one or more wireless APs 200 that have to relay the same segment data in the same time slot (that is, do not have overlapping cells). Further, the control unit 140 allocates different multicast addresses to the wireless APs 200 that have to relay the same segment data in different time slots (that is, may have overlapping cells). Further, the control unit 140 causes first segment data having a first multicast address allocated thereto to be transmitted from the communication unit 110 to the network 14 in a first time slot in a certain time window. The wireless AP 200 having the first multicast address allocated thereto recognizes that the first segment data is data that has to be relayed by the wireless AP 200 (that is, filters a packet), and delivers the first segment data to the terminal device 300 in the first time slot. Thereafter, the control unit 140 causes second segment data that has a second multicast address allocated thereto and includes the same segment as the first segment data to be transmitted from the communication unit 110 to the network 14 in a second time slot in the same time window. The wireless AP 200 having the second multicast address allocated thereto recognizes that the second segment data is data that has to be relayed by the wireless AP 200 (that is, filters a packet), and delivers the second segment data to the terminal device 300 in the second time slot. The control unit 140 does not cause data to be delivered from the wireless AP 200 having the second multicast address allocated thereto in the first time slot. Similarly, the control unit 140 does not cause data to be delivered from the wireless AP 200 having the first multicast address allocated thereto in the second time slot. According to such a mechanism, it is possible to prevent wireless packets of the segment data from interfering between cells by controlling a transfer timing for each multicast address (destination IP address) allocated to the segment data.

Further, the control unit 140 may arrange a guard interval in which no data is transferred to any wireless APs 200 between adjacent time slots. Thus, even when the delivery of the segment data is delayed slightly in a certain time slot due to buffering and a transmission delay, it is possible to prevent a wireless packet of corresponding segment data from interfering with a wireless packet of subsequent segment data.

(5) Slot Configuration DB

The wireless APs 200 (or corresponding cells) included in the data delivery system 10 may be classified (that is, grouped) according to an attribute such as a color for the sake of convenience. Different colors are allocated to the wireless APs 200 including cells overlapping each other. A color corresponds to a combination of a frequency channel and a time slot to be used. In the example of FIG. 1, different colors are allocated to the wireless AP 200a, the wireless AP 200b, and the wireless AP 200c. Different colors are allocated to the wireless AP 200b, the wireless AP 200c, and the wireless AP 200d as well. The same color may be allocated to the wireless AP 200a and the wireless AP 200d. The slot configuration DB 150 stores slot configuration data in which mapping of a time slot, a multicast address, and a frequency channel is defined for each color.

FIG. 3A is an explanatory diagram illustrating a first example of the slot configuration data. Referring to FIG. 3A, slot configuration data 142a includes four data items, that is, "color," "time slot," "multicast address," and "frequency channel." In the first example, a color "C1" corresponds to a combination of a time slot "T1" and a frequency channel "F1." A color "C2" corresponds to a combination of the time slot "T1" and a frequency channel "F2." A multicast address "239.192.50.1" is allocated to the color "C1" and the color "C2." A color "C3" corresponds to a combination of a time slot "T2" and the frequency channel "F1." A color "C4" corresponds to the combination of the time slot "T2" and the frequency channel "F2." A multicast address "239.192.50.2" is allocated to the color "C3" and the color "C4." For example, the colors C1, C2, C3, and C4 may be colors of the wireless APs 200a, 200b, 200c, and 200d, respectively.

FIG. 4A is an explanatory diagram for describing a slot configuration corresponding to the slot configuration data 142a illustrated in FIG. 3A. Referring to FIG. 4A, a time window W1 and a time window W2 subsequent to the time window W1 are illustrated. Each time window includes a time slot T1 and a time slot T2. A guard interval is arranged between adjacent time slots. For example, when a time slot length is assumed to be 400 [ms] and a guard interval length is assumed to be 100 [ms], the length of one time window is equal to 1000 [ms] (=(400+100)×2) (that is, one second).

The control unit 140 causes the segment data having the multicast address "239.192.50.1" allocated thereto to be transmitted from the communication unit 110 in the time slot T1 of the time window W1. The segment data is received by the wireless AP 200a corresponding to the color C1 and the wireless AP 200b corresponding to the color C2. The wireless AP 200a delivers the received segment data to the terminal device 300 in the cell Ca through the frequency channel F1 in the time slot T1. The wireless AP 200b delivers the segment data received in the time slot T1 to the terminal device 300 in the cell Cb through the frequency channel F2.

Then, the control unit 140 causes the segment data having the multicast address "239.192.50.2" allocated thereto to be transmitted from the communication unit 110 in the time slot T2 of the time window W1. Here, the transmitted segment data includes the same segment as the segment data in the time slot T1. The segment data is received by the wireless AP 200c corresponding to the color C3 and the wireless AP 200d corresponding to the color C4. The wireless AP 200c delivers the segment data received in the time slot T2 to the terminal device 300 in the cell Cc through the frequency channel F1. The wireless AP 200d delivers the segment data received in the time slot T2 to the terminal device 300 in the cell Cd through the frequency channel F2.

In the subsequent time window W2, the segment data having a different multicast address allocated thereto for the next segment of the streaming data is transmitted in each of the time slots T1 and T2. The terminal device 300 can identify the segment delivery period (here, equal to the length of the time window) by comparing the time stamps of the consecutively received segment data. According to the slot configuration defined by the slot configuration data 142a, even when a maximum of four cells overlap each other, it is possible to prevent data from being delivered simultaneously in the overlapping area through the same frequency channel.

FIG. 3B is an explanatory diagram illustrating a second example of the slot configuration data. In the second example, a color "C1" corresponds to a combination of a time slot "T1" and a frequency channel "F1." A multicast address "239.192.50.1" is allocated to the color "C1." A color "C2" corresponds to a combination of a time slot "T2" and the frequency channel "F1." A multicast address "239.192.50.2" is allocated to the color "C2." A color "C3" corresponds to a combination of a time slot "T3" and the frequency channel "F1." A multicast address "239.192.50.3" is allocated to the color "C3." For example, the color C1 may be a color of the wireless AP 200a and the wireless AP 200d, the color C2 may be a color of the wireless AP 200b, and the color C3 may be a color of the wireless AP 200c.

FIG. 4B is an explanatory diagram for describing a slot configuration corresponding to slot configuration data 142b illustrated in FIG. 3B. Referring to FIG. 4B, a time window W1 and a time window W2 subsequent to the time window W1 are illustrated. Each time window includes a time slot T1, a time slot T2, and a time slot T3. A guard interval is arranged between adjacent time slots.

The control unit 140 causes the segment data having the multicast address "239.192.50.1" allocated thereto to be transmitted from the communication unit 110 in the time slot T1 of the time window W1. The segment data is received by the wireless AP 200a and the wireless AP 200d corresponding to the color C1. The wireless AP 200a and the wireless AP 200d delivers the segment data received in the time slot T1 to the terminal devices 300 in the cell Ca and the cell Cd through the frequency channel F1.

Then, the control unit 140 causes the segment data having the multicast address "239.192.50.2" allocated thereto to be transmitted from the communication unit 110 in the time slot T2 of the time window W1. Here, the transmitted segment data includes the same segment as the segment data in the time slot T1. The segment data is received by the wireless AP 200b corresponding to the color C2. The wireless AP 200b delivers the segment data received in the time slot T2 to the terminal device 300 in the cell Cb through the frequency channel F1.

Then, the control unit 140 causes the segment data having the multicast address "239.192.50.3" allocated thereto to be transmitted from the communication unit 110 in the time slot T3 of the time window W1. Here, the transmitted segment data includes the same segment as the segment data in the time slots T1 and T2. The segment data is received by the wireless AP 200c corresponding to the color C3. The wireless AP 200c delivers the segment data received in the time slot T3 to the terminal device 300 in the cell Cc through the frequency channel F1.

In the subsequent time window W2, the segment data having a different multicast address allocated thereto for the next segment of the streaming data is transmitted in each of the time slots T1, T2, and T3. According to the slot configuration defined by the slot configuration data 142b, even when a maximum of three cells overlap each other, it is possible to prevent data from being delivered simultaneously in the overlapping area through the same frequency channel.

Generally speaking, the control unit 140 arranges M (M≥2) time slots for delivering respective segments from different access points in one time window. The number M of time slots in each time window is decided depending on a maximum of the number of access points that includes cells overlapping each other and uses the same frequency channel. If the number of overlapping cells at a position at which the largest number of cells overlap in the service area is C (C≥2), and the number of available frequency channels is F (F≥1), M may be the smallest integer that does not fall below C/F.

For example, when it is desired to cover a long and thin space such as a train or a small station through a plurality of cells, it is sufficient for the cells to be arranged in a straight line form, and a maximum value C of the number of overlapping cells is equal to 2. In this case, when the number F of available frequency channels is 1, C/F is 2, and thus it is sufficient for the number M of time slots in the time window to be 2. On the other hand, when it is desired to cover a large planar space such as a stadium or a park or a large stereoscopic space such as a shopping center, the maximum value C of the number of overlapping cells is 3 or more even when the cells are ideally arranged. The control unit 140 reads the slot configuration data defined to be suitable for an arrangement of cells in the service area and the number of available frequency channels from the slot configuration DB 150, and controls the delivery of the streaming data according to the read slot configuration data.

Further, the data delivery server 100 and the wireless AP 200 need not necessarily use the IP address filtering function. For example, the data transfer unit 124 may insert a sign identifying the wireless AP 200 that relays corresponding data into the header of the segment data and then broadcast the segment data to the network 14. In this case, when the wireless AP 200 is determined to have to relay the segment data based on the sign in the header of the received segment data, the wireless AP 200 relays the segment data to the terminal device 300.

[2-2. Delivery of Plurality of Pieces of Streaming Data]

The control unit 140 may divide each time slot into a plurality of sub slots and cause segments of first streaming data and segments of second streaming data to be delivered from respective access points in different sub slots in the same time slot. For example, the first streaming data and the second streaming data may be data of different content services or may be data of a plurality of streams (for example, a plurality of broadcasting channels of a television broadcasting service) of one integrated content service.

Figure 5:
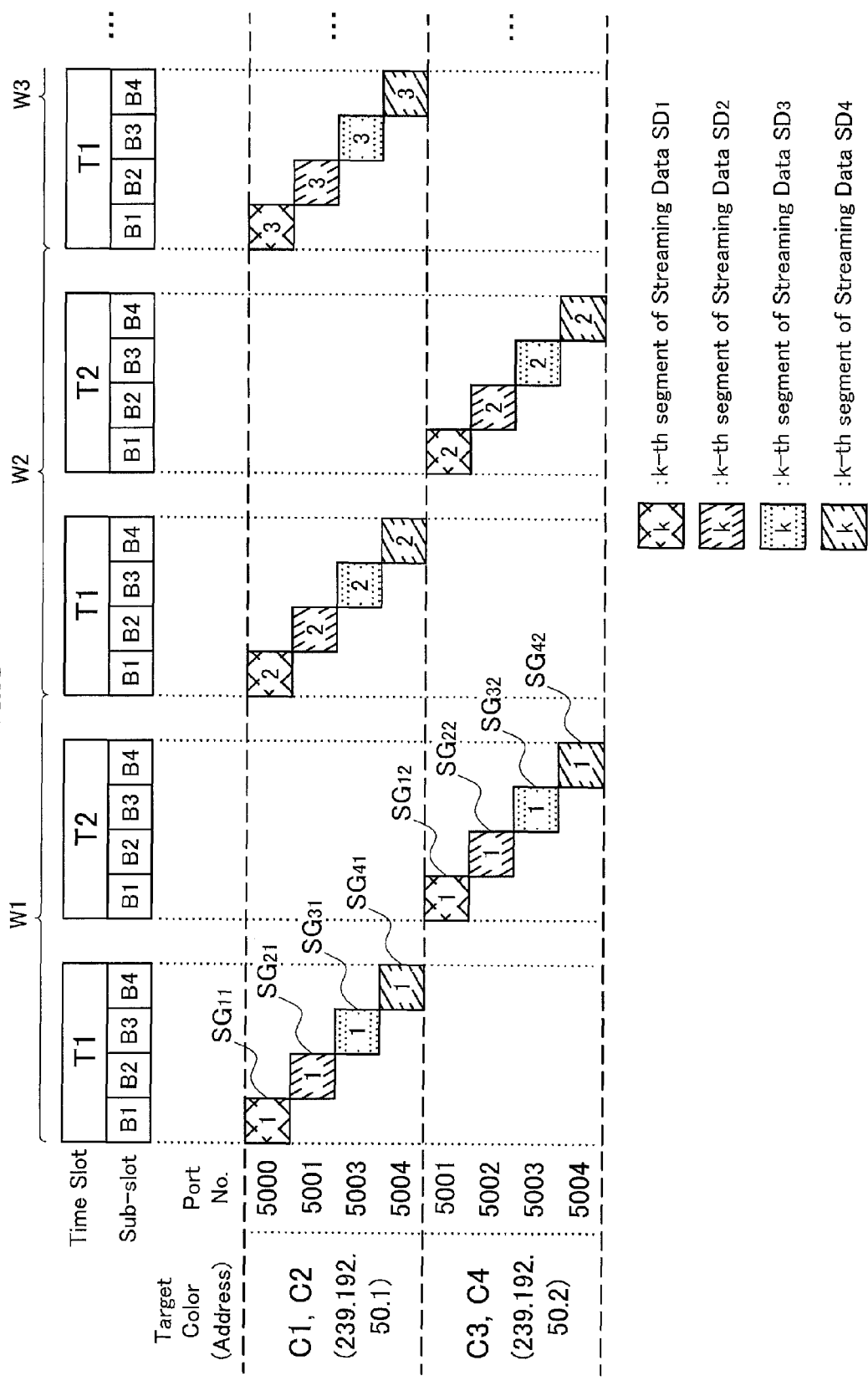
FIG. 5 is an explanatory diagram for describing delivery of a plurality of pieces of streaming data.

FIG. 5 is an explanatory diagram for describing delivery of a plurality of pieces of streaming data. Referring to FIG. 5, temporally consecutive time windows W1, W2, and W3 are illustrated. Each time window includes two time slots T1 and T2. Each of the time slots T1 and T2 includes four sub slots B1, B2, B3, and B4. In the example of FIG. 5, four colors C1, C2, C3, and C4 are assumed to be defined according to the slot configuration data 142$a$ illustrated in FIG. 3A. For example, when a sub slot length is assumed to be 100 [ms], and a guard interval length is assumed to be 100 [ms], a time slot length is equal to 400 [ms] (=100×4), and the length of one time window is equal to 1000 [ms] (=(400+100)×2) (that is, one second).

For example, the control unit 140 causes first segment data $SG_{11}$ of streaming data $SD_1$ to be transmitted from the communication unit 110 in the sub slot B1 of the time slot T1 of the time window W1. The control unit 140 causes first segment data $SG_{21}$ of streaming data $SD_2$ to be transmitted from the communication unit 110 in the sub slot B2 of the same time slot T1. The control unit 140 causes first segment data $SG_{31}$ of streaming data $SD_3$ to be transmitted from the communication unit 110 in the sub slot B3 of the same time slot T1. The control unit 140 causes first segment data $SG_{4I}$ of streaming data $SD_4$ to be transmitted from the communication unit 110 in the sub slot B4 of the same time slot T1. The multicast address "239.192.50.1" is commonly allocated to the segment data $SG_{11}$, $SG_{21}$, $SG_{31}$, and $SG_{41}$ as the destination IP address, and "5001," "5002," "5003," and "5004" are allocated to the segment data $SG_{11}$, $SG_{21}$, $SG_{31}$, and $SG_{41}$ as the destination port number. The segment data $SG_{11}$, $SG_{21}$, $SG_{31}$, and $SG_{41}$ is received by the wireless AP 200$a$ corresponding to the color C1 and the wireless AP 200$b$ corresponding to the color C2. The wireless AP 200$a$ sequentially delivers the segment data $SG_{11}$, $SG_{21}$, $SG_{31}$, and $SG_{41}$ to the terminal device 300 in the cell Ca in the sub slots B1, B2, B3, and B4 through the frequency channel F1. The wireless AP 200$b$ sequentially delivers the segment data $SG_{11}$, $SG_{21}$, $SG_{31}$, and $SG_{41}$ to the terminal device 300 in the cell Cb in the sub slots B1, B2, B3, and B4 through the frequency channel F2.

Next, the control unit 140 causes first segment data $SG_{12}$ of streaming data $SD_1$ to be transmitted from the communication unit 110 in the sub slot B1 of the time slot T2 of the time window W1. The control unit 140 causes first segment data $SG_{22}$ of streaming data $SD_2$ to be transmitted from the communication unit 110 in the sub slot B2 of the same time slot T2. The control unit 140 causes first segment data $SG_{32}$ of streaming data $SD_3$ to be transmitted from the communication unit 110 in the sub slot B3 of the same time slot T2. The control unit 140 causes first segment data $SG_{42}$ of streaming data $SD_4$ to be transmitted from the communication unit 110 in the sub slot B4 of the same time slot T2. The multicast address "239.192.50.2" is commonly allocated to the segment data $SG_{12}$, $SG_{22}$, $SG_{32}$, and $SG_{42}$ as the destination IP address, and "5001," "5002," "5003," and "5004" are allocated to the segment data $SG_{12}$, $SG_{22}$, $SG_{32}$, and $SG_{42}$ as the destination port number. The segment data $SG_{12}$, $SG_{22}$, $SG_{32}$, and $SG_{42}$ is received by the wireless AP 200$c$ corresponding to the color C3 and the wireless AP 200$d$ corresponding to the color C4. The wireless AP 200$c$ sequentially delivers the segment data $SG_{12}$, $SG_{22}$, $SG_{32}$, and $SG_{42}$ to the terminal device 300 in the cell Cc in the sub slots B1, B2, B3, and B4 through the frequency channel F1. The wireless AP 200$d$ sequentially delivers the segment data $SG_{12}$, $SG_{22}$, $SG_{32}$, and $Sa_{42}$ to the terminal device 300 in the cell Cd in the sub slots B1, B2, B3, and B4 through the frequency channel F2.

In the time slot T1 of the subsequent time window W2, for next segments of four types of streaming data, segment data to which the multicast address allocated to the colors C1 and C2 is allocated is sequentially transmitted in units of sub slots. In the time slot T2 of the time window W2, for next segments of four types of streaming data, segment data to which the multicast address allocated to the colors C3 and C4 is allocated is sequentially transmitted in units of sub slots.

The terminal device 300 may receive all the segments of the four types of streaming data delivered within one time slot or may receive only segments of some selected streaming data. Typically, in the terminal device 300, segments of streaming data of content of a service selected by the user may be decoded and reproduced.

According to such a slot configuration, it is possible to provide a plurality of pieces of streaming data to the terminal device 300 and enable the user to select data desired to be reproduced while preventing data from being delivered simultaneously through the same frequency channel in an area in which cells overlap each other.

Further, different streaming data may be identified using an additional sign inserted into a header of a data packet instead of a port number. When a port number is used, it is possible to support delivery of a plurality of pieces of streaming data at a low implementation cost without adding a new sign to a header.

[2-3. Redundant Segment Delivery]

In the common wireless LAN scheme, it typically takes a time of about one second to perform an inter-cell handover (in this specification, the term "handover" is assumed to include roaming between BSSs). A high-speed handover technique in which a handover time in an OBSS environment is less than 50 ms is defined in IEEE 802.11r, but the existing terminal device does not support the high-speed handover technique. In this regard, in order to secure streaming continuity at the time of the inter-cell handover, the control unit 140 may cause the same segment as a segment delivered in a time slot in a certain time window to be redundantly delivered from the wireless AP 200 in a time slot in a subsequent time window. A time difference between the time slots may be decided based on a reference value (for example, an average value or a mode of times measured through prior tests) of a period of time taken for an inter-cell handover. In this specification, of two streams that are redundantly delivered, a stream that is first delivered is referred to a main stream, and a stream that is delivered later is referred to as a sub stream.

Figure 6:
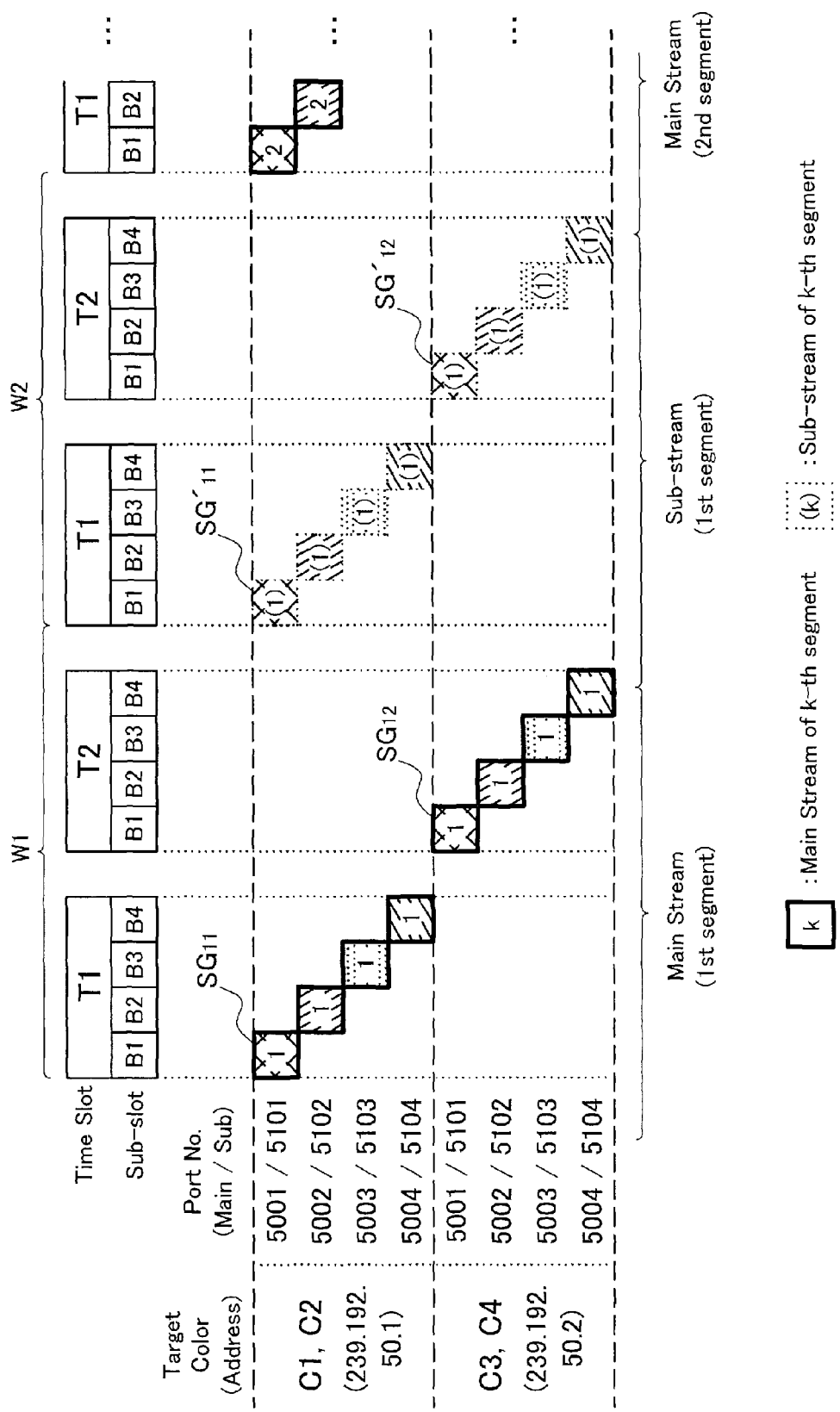
FIG. 6 is an explanatory diagram for describing redundant segment delivery.

FIG. 6 is an explanatory diagram for describing redundant segment delivery. Referring to FIG. 6, temporally consecutive time windows W1 and W2 are illustrated. Each time window includes two time slots T1 and T2. Each of the time slots T1 and T2 includes four sub slots B1, B2, B3, and B4. In the example of FIG. 6, four colors C1, C2, C3, and C4 are assumed to be defined according to the slot configuration data 142a illustrated in FIG. 3A.

For example, the control unit 140 causes first segment data $SG_{11}$ of a main stream of streaming data $SD_1$ to be transmitted from the communication unit 110 in the sub slot B1 of the time slot T1 of the time window W1. The multicast address "239.192.50.1" is allocated to the segment data $SG_{11}$ as the destination IP address, and "5001" is allocated to the segment data $SG_{11}$ as the destination port number. The segment data $SG_{11}$ is received by the wireless AP 200a corresponding to the color C1 and the wireless AP 200b corresponding to the color C2. The wireless AP 200a delivers the segment data $SG_{11}$ of the main stream to the terminal device 300 in the cell Ca in the sub slot B1 through the frequency channel F1. The wireless AP 200b delivers the segment data $SG_{11}$ of the main stream to the terminal device 300 in the cell Cb in the sub slot B1 through the frequency channel F2.

Further, for example, the control unit 140 causes first segment data $SG_{12}$ of a main stream of streaming data $SD_1$ to be transmitted from the communication unit 110 in the sub slot B1 of the time slot T2 of the time window W1. The multicast address "239.192.50.2" is allocated to the segment data $SG_{12}$ as the destination IP address, and "5001" is allocated to the segment data $SG_{12}$ as the destination port number. The segment data $SG_{12}$ is received by the wireless AP 200c corresponding to the color C3 and the wireless AP 200d corresponding to the color C4. The wireless AP 200c delivers the segment data $SG_{12}$ of the main stream to the terminal device 300 in the cell Cc in the sub slot B1 through the frequency channel F1. The wireless AP 200d delivers the segment data $SG_{12}$ of the main stream to the terminal device 300 in the cell Cd in the sub slot B1 through the frequency channel F2.

Then, the control unit 140 causes first segment data $SG'_{11}$ of a sub stream of streaming data $SD_1$ to be transmitted from the communication unit 110 in the sub slot B1 of the time slot T1 of the time window W2. The segment data $SG'_{11}$ is a data packet including the same segment as the segment data $SG_{11}$ of the main stream. The multicast address "239.192.50.1" is allocated to the segment data $SG'_{11}$ as the destination IP address, and "5101" is allocated to the segment data $SG'_{11}$ as the destination port number. The segment data $SG'_{11}$ is received by the wireless AP 200a corresponding to the color C1 and the wireless AP 200b corresponding to the color C2. The wireless AP 200a delivers the segment data $SG'_{11}$ of the sub stream to the terminal device 300 in the cell Ca in the sub slot B1 of the time slot T1 of the time window W2 through the frequency channel F1. The wireless AP 200b delivers the segment data $SG'_{11}$ of the sub stream to the terminal device 300 in the cell Cb in the sub slot B1 of the time slot T1 of the time window W2 through the frequency channel F2.

Further, for example, the control unit 140 causes first segment data $SG'_{12}$ of a sub stream of streaming data $SD_1$ to be transmitted from the communication unit 110 in the sub slot B1 of the time slot T2 of the time window W2. The segment data $SG'_{12}$ is a data packet including the same segment as the segment data $SG_{12}$ of the main stream. The multicast address "239.192.50.2" is allocated to the segment data $SG'_{12}$ as the destination IP address, and "5101" is allocated to the segment data $SG'_{12}$ as the destination port number. The segment data $SG'_{12}$ is received by the wireless AP 200c corresponding to the color C3 and the wireless AP 200d corresponding to the color C4. The wireless AP 200c delivers the segment data $SG'_{12}$ of the sub stream to the terminal device 300 in the cell Cc in the sub slot B1 of the time slot T2 of the time window W2 through the frequency channel F1. The wireless AP 200d delivers the segment data $SG'_{12}$ of the sub stream to the terminal device 300 in the cell Cd in the sub slot B1 of the time slot T2 of the time window W2 through the frequency channel F2.

The segment data of the main stream and the sub stream of next segments of the streaming data are each further transmitted in two subsequent time windows.

The terminal device 300 receives a series of segment data of the main stream in normal circumstances. Further, when the handover has been executed and thereafter the segment data of the main stream has not been received, the terminal device 300 can receive the segment data of the sub stream delivered in the subsequent time window. As a result, it is possible to reduce a risk of streaming continuity being lost at the time of handover. For example, in the example of FIG. 5 in which the redundant segment delivery is not performed, when the terminal device 300 performs the handover from the cell of the color C3 to the cell of the color C1, in order to successfully receive two consecutive segments of the same streaming data, the handover procedure has to be completed within a period of time of 400 ms (for example, a duration from the end of the sub slot B1 of the time slot T2 of the time window W1 to the start of the sub slot B1 of the time slot T1 of the time window W2 is 400 ms). On the other hand, in the example of FIG. 6 in which the redundant segment delivery is performed, when the terminal device 300 performs the handover from the cell of the color C3 to the cell of the color C1, in order to successfully receive two consecutive segments of the same streaming data, it is desirable that the handover procedure be completed within a period of time of 2400 ms (for example, it is desirable that the segment data of the sub stream be received in the sub slot B1 of the time slot T1 of the third subsequent time window after the segment data of the main stream is received in the sub slot B1 of the time slot T2 of the time window W1).

Further, when the terminal device 300 has access to the data delivery system 10 for the first time or selects a service to be newly reproduced, if the segment data of the sub stream is first detected, the terminal device 300 may start to decode content from the segment data of the sub stream. Thus, it is possible to reduce a standby time until content reproduction starts. Further, the terminal device 300 may receive both the segment data of the main stream and the segment data of the sub stream and decode content from the segment data of the stream showing better reception quality. Thus, it is possible to obtain a diversity gain and implement high-quality content reproduction.

A notification of a port number difference between the main stream and the sub stream may be given from the data delivery server 100 to the terminal device 300 through the wireless AP 200 in advance. The terminal device 300 can identify which of the main stream and the sub stream has been received with reference to the port number of the received segment data.

Here, for the sake of simplicity of description, the example in which one data packet is transmitted in one sub slot has been described. However, practically, a number of data packets each including one segment piece are shaped in one sub slot (that is, arranged at equal time intervals) and then transmitted. Further, the data transfer unit 124 may apply application layer-forward error correction (AL-FEC) to the data packet to be transmitted to the wireless AP 200.

[2-4. Exemplary Implementation]

In this section, an example of a detailed specification for implementing the data delivery server 100 is proposed. An exemplary implementation described herein is merely an example and not intended to limit the scope of the technology according to the present disclosure.

For example, the streaming data provided by the content server 20 is multimedia content described in an MPEG2-transport stream (TS) format. For example, the streaming data of the multimedia content includes a video stream encoded by an MPEG Advanced Video Coding (AVC)/H.264 scheme and an audio stream encoded by an Advanced Audio Coding (AAC) scheme. When the content server 20 is implemented as a web server, for example, the data delivery server 100 can acquire the streaming data from the content server 20 by transmitting an HTTP request to the content server 20 according to an MPEG Dynamic Adaptive Streaming over HTTP (DASH) scheme.

When an image resolution of video content is 440×360 pixels, an average bit rate of one piece of streaming data is about 1 [Mbps]. When a nominal transfer rate of a wireless link between the wireless AP 200 and the terminal device 300 is 24 [Mbps], for example, an effective bit rate of multicast communication may be about 16 [Mbps]. In this case, when the number M of time slots in one time window is equal to 2, eight pieces of streaming data can be delivered in a time division manner. When the redundant delivery is performed, the number of pieces of streaming data that can be delivered in parallel is 4 (=8/2).

The data delivery server 100 temporarily stores the streaming data acquired from the content server 20 in the receiving buffer 132, and transfers the segment data to the transmitting buffer 134, for example, at a point in time at which an amount of data corresponding to one second is accumulated. For example, when the streaming data is received via the Internet, a delay on the network is absorbed by the receiving buffer 132. The data in the receiving buffer 132 may be deleted when unnecessary. For example, the segment data is generated in a real-time transport protocol (RTP) format. The multicast address (destination IP address) and the port number (the destination port number) illustrated in FIGS. 4A and 4B are inserted into the header of the RTP packet. Further, the data transfer unit 124 adds a time stamp for causing the terminal device to recognize the segment delivery period to the header of the RTP packet. A value of the time stamp is acquired from the reference clock (also referred to as a "wall clock") and increases with the lapse of time and circulates to zero when a maximum value is reached. Each piece of segment data in the transmitting buffer 134 is read by the data transfer unit 124 and transmitted to the network 14 in a corresponding time slot.

[2-5. Process Flow]

In this section, examples of the flow of the data delivery process performed by the data delivery server 100 will be described. Here, for the sake of simplicity of description, it is assumed that each time slot is not divided into a plurality of sub slots, and segments of one piece of streaming data are transferred in one time slot.

(1) First Example

Figure 7A:
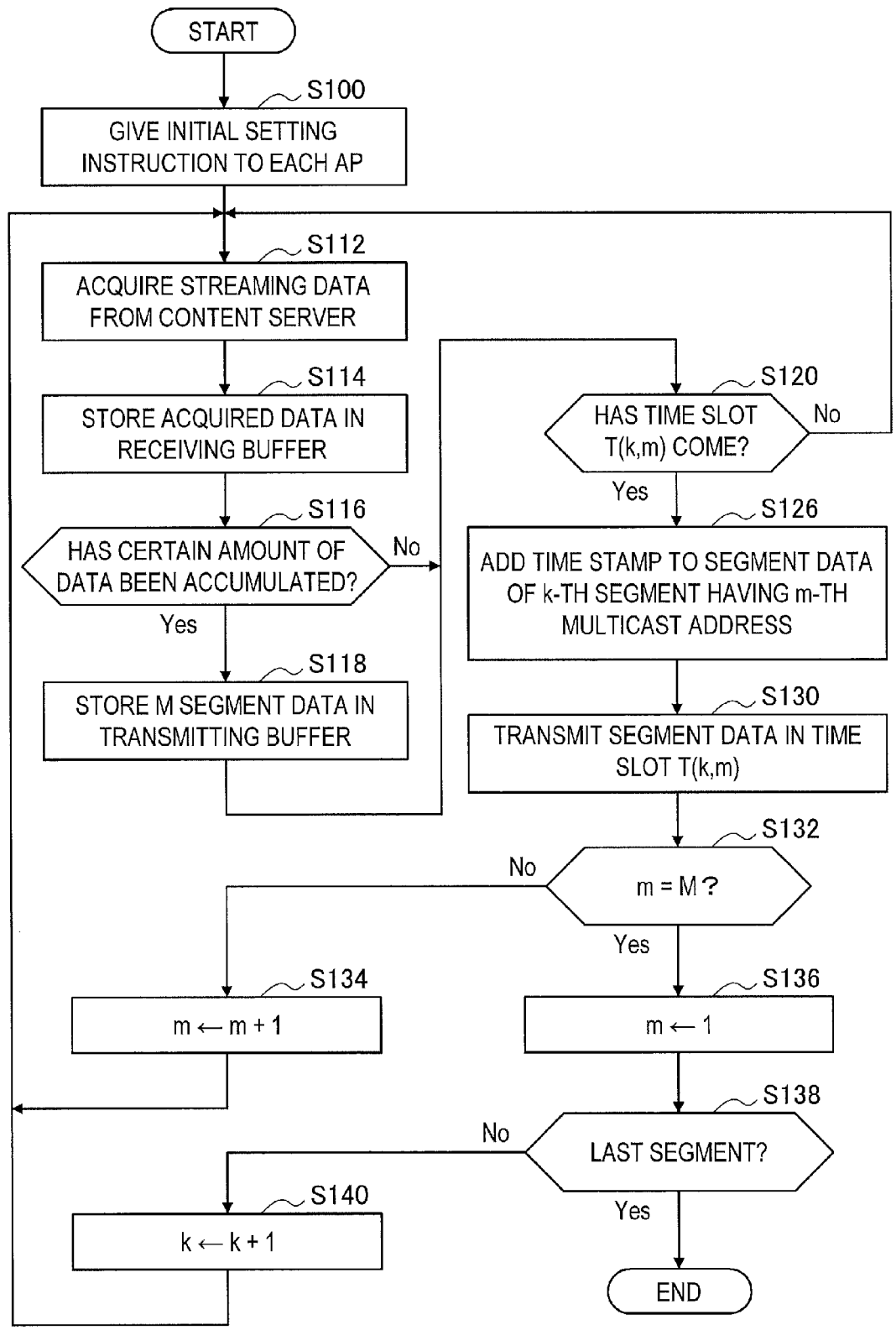
FIG. 7A is a flowchart illustrating a first example of the flow of a data delivery process.

FIG. 7A is a flowchart illustrating a first example of the flow of the data delivery process performed by the data delivery server 100. In the first example, the redundant segment delivery is not performed.

Referring to FIG. 7A, first, the control unit 140 instructs the wireless AP 200 in the data delivery system 10 to perform an initial setting (step S100). For example, each of the wireless APs 200 sets the IP address filtering function so that a packet having a multicast address allocated to itself as the destination IP address is relayed. Further, each of the wireless APs 200 sets a frequency channel to be used in each cell to an instructed frequency channel. Further, each of the wireless APs 200 disables the traffic notification message function on the terminal device 300 that receives the streaming data.

Then, the data acquiring unit 122 acquires the streaming data to be delivered to one or more terminal devices in the service area of the data delivery system 10 from the content server 20 (step S112). Then, the data acquiring unit 122 stores the acquired streaming data in the receiving buffer 132 (step S114).

Then, the control unit 140 determines whether or not a certain amount (for example, an amount corresponding to content of one second) of streaming data has been accumulated in the receiving buffer 132 (step S116). Then, when a certain amount of streaming data is determined to have been accumulated, the control unit 140 copies the accumulated data to generate M pieces of segment data, and stores the generated segment data in the transmitting buffer 134 (step S118). M indicates the number of time slots in the time window and is equal to the number of multicast addresses as well. The control unit 140 inserts an m-th multicast address defined by the slot configuration data into the header of m-th (m=1, . . . , M) segment data as the destination IP address.

Then, the control unit 140 determines whether or not an m-th time slot T (k,m) of a k-th time window has come (step S120). Further, k is an ordinal number of the time window, and an initial value of k is 1. When the time slot T (k,m) has not come, the process returns to step S112. When the time slot T (k,m) has come, the data transfer unit 124 reads the segment data of the k-th segment having the m-th multicast address stored in the transmitting buffer 134, and adds the time stamp to the read segment data (step S126). Then, the data transfer unit 124 transmits the segment data with the time stamp added thereto to the network 14 in the time slot T (k,m) via the communication unit 110 (step S130).

Then, the control unit 140 determines whether or not the ordinal number m of the time slot is equal to M (that is, whether or not transmission of the segment data in the last time slot in the time window has ended) (step S132). Here, when m is not equal to M, a value of the ordinal number m is counted up (step S134), and the process returns to step S112.

When m is determined to be equal to M in step S132, the ordinal number m is initialized to a value of 1 (step S136), it is further determined whether or not transmission of the segment data for the last segment of the streaming data has ended (step S138). When the transmission of the segment data for the last segment has not ended, the value of the ordinal number k is counted up (step S140), and the process returns to step S112. When the transmission of the segment data for the last segment has ended, the data delivery process of FIG. 7A ends.

(2) Second Example

Figure 7B:
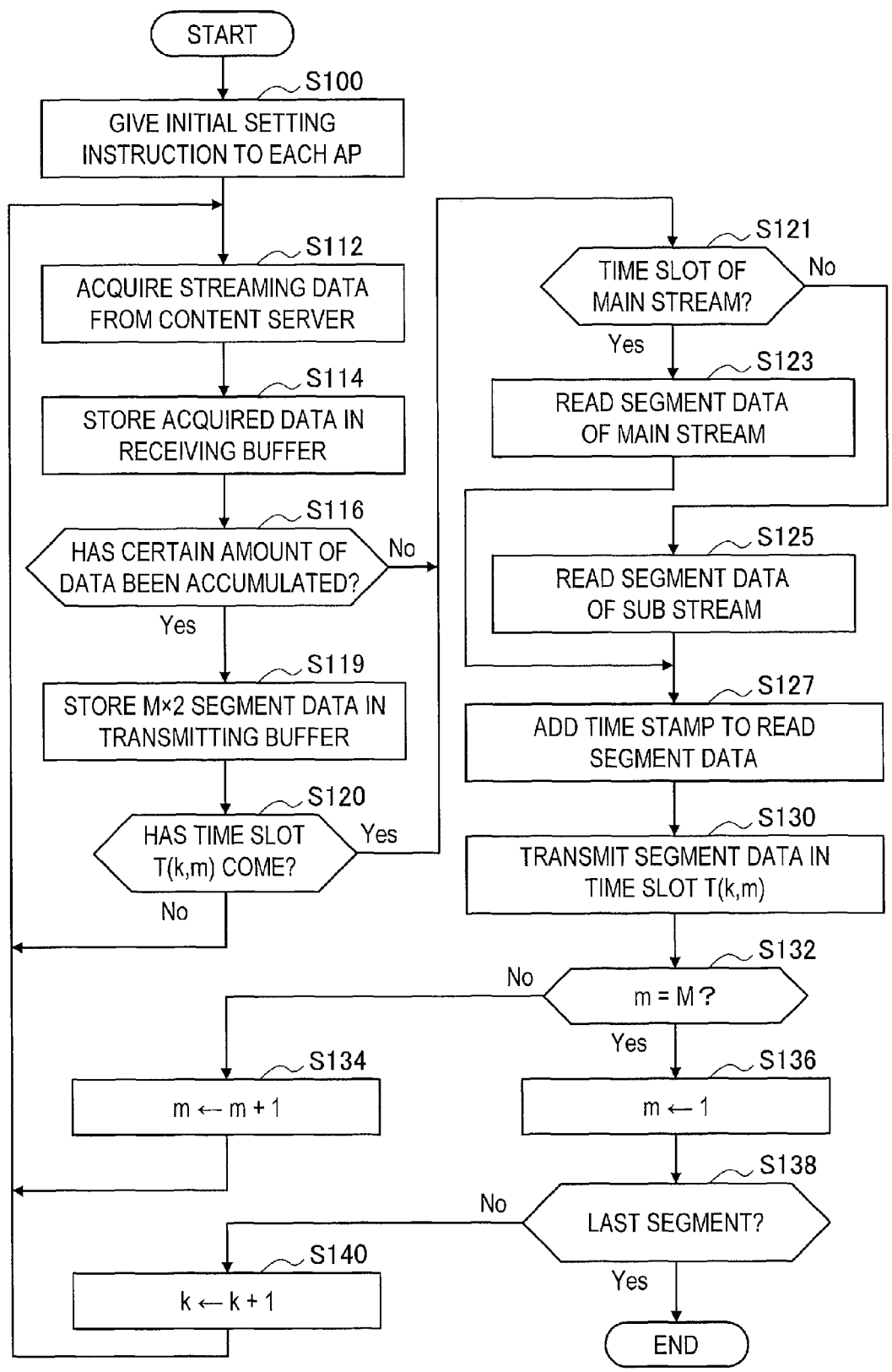
FIG. 7B is a flowchart illustrating a second example of the flow of the data delivery process.

FIG. 7B is a flowchart illustrating a second example of the flow of the data delivery process performed by the data delivery server 100. In the second example, the redundant segment delivery is performed.

Referring to FIG. 7B, first, the control unit 140 instructs the wireless AP 200 in the data delivery system 10 to perform an initial setting (step S100). For example, each of the wireless APs 200 sets the IP address filtering function so that a packet having a multicast address allocated to itself as the destination IP address is relayed. Further, each of the wireless APs 200 sets a frequency channel to be used in each cell to an instructed frequency channel. Further, each of the wireless APs 200 disables the traffic notification message function on the terminal device 300 that receives the streaming data.

Then, the data acquiring unit 122 acquires the streaming data to be delivered to one or more terminal devices in the service area of the data delivery system 10 from the content server 20 (step S112). Then, the data acquiring unit 122 stores the acquired streaming data in the receiving buffer 132 (step S114).

Then, the control unit 140 determines whether or not a certain amount (for example, an amount corresponding to content of two seconds) of streaming data has been accumulated in the receiving buffer 132 (step S116). Then, when a certain amount of streaming data is determined to have been accumulated, the control unit 140 copies the accumulated data to generate M×2 pieces of segment data (M pieces of segment data of the main stream and M pieces of segment data of the sub stream), and stores the generated segment data in the transmitting buffer 134 (step S119). M indicates the number of time slots in the time window and is equal to the number of multicast addresses as well. The control unit 140 inserts the m-th multicast address and the port number corresponding to the main stream into the header of the segment data of the m-th (m=1, . . . , M) main stream as the destination IP address and the destination port number. Further, the control unit 140 inserts the m-th multicast address and the port number corresponding to the sub stream into the header of the segment data of the m-th sub stream as the destination IP address and the destination port number.

Then, the control unit 140 determines whether or not an m-th time slot T (k,m) of a k-th time window has come (step S120). Further, k is the ordinal number of the time window, and the initial value of k is 1. When the time slot T (k,m) has not come, the process returns to step S112. When the time slot T (k,m) has come, the control unit 140 determines whether the time slot is the time slot for the main stream or the time slot for the sub stream (step S121). For example, when k is an odd number, the time slot T (k,m) is the time slot for the main stream, and when k is an even number, the time slot T (k,m) is the time slot for the sub stream.

When the time slot T (k,m) is the time slot for the main stream, the data transfer unit 124 reads the segment data of the main stream of a (k+1)/2-th segment having the m-th multicast address which is stored in the transmitting buffer 134 (step S123). When the time slot T (k,m) is the time slot for the sub stream, the data transfer unit 124 reads the segment data of the sub stream of a k/2-th segment having the m-th multicast address which is stored in the transmitting buffer 134 (step S125).

Then, the data transfer unit 124 adds the time stamp to the read segment data (step S127). Then, the data transfer unit 124 transmits the segment data with the time stamp added thereto to the network 14 in the time slot T (k,m) via the communication unit 110 (step S130).

Then, the control unit 140 determines whether or not the ordinal number m of the time slot is equal to M (that is, whether or not transmission of the segment data in the last time slot in the time window has ended) (step S132). Here, when m is not equal to M, a value of the ordinal number m is counted up (step S134), and the process returns to step S112.

When m is determined to be equal to M in step S132, the ordinal number m is initialized to a value of 1 (step S136), it is further determined whether or not transmission of the segment data for the last segment of the streaming data has ended (step S138). When the transmission of the segment data for the last segment has not ended, the value of the ordinal number k is counted up (step S140), and the process returns to step S112. When the transmission of the segment data for the last segment has ended, the data delivery process of FIG. 7B ends.

3. EXEMPLARY CONFIGURATION OF WIRELESS ACCESS POINT

[3-1. Configuration of Device]

Figure 8:
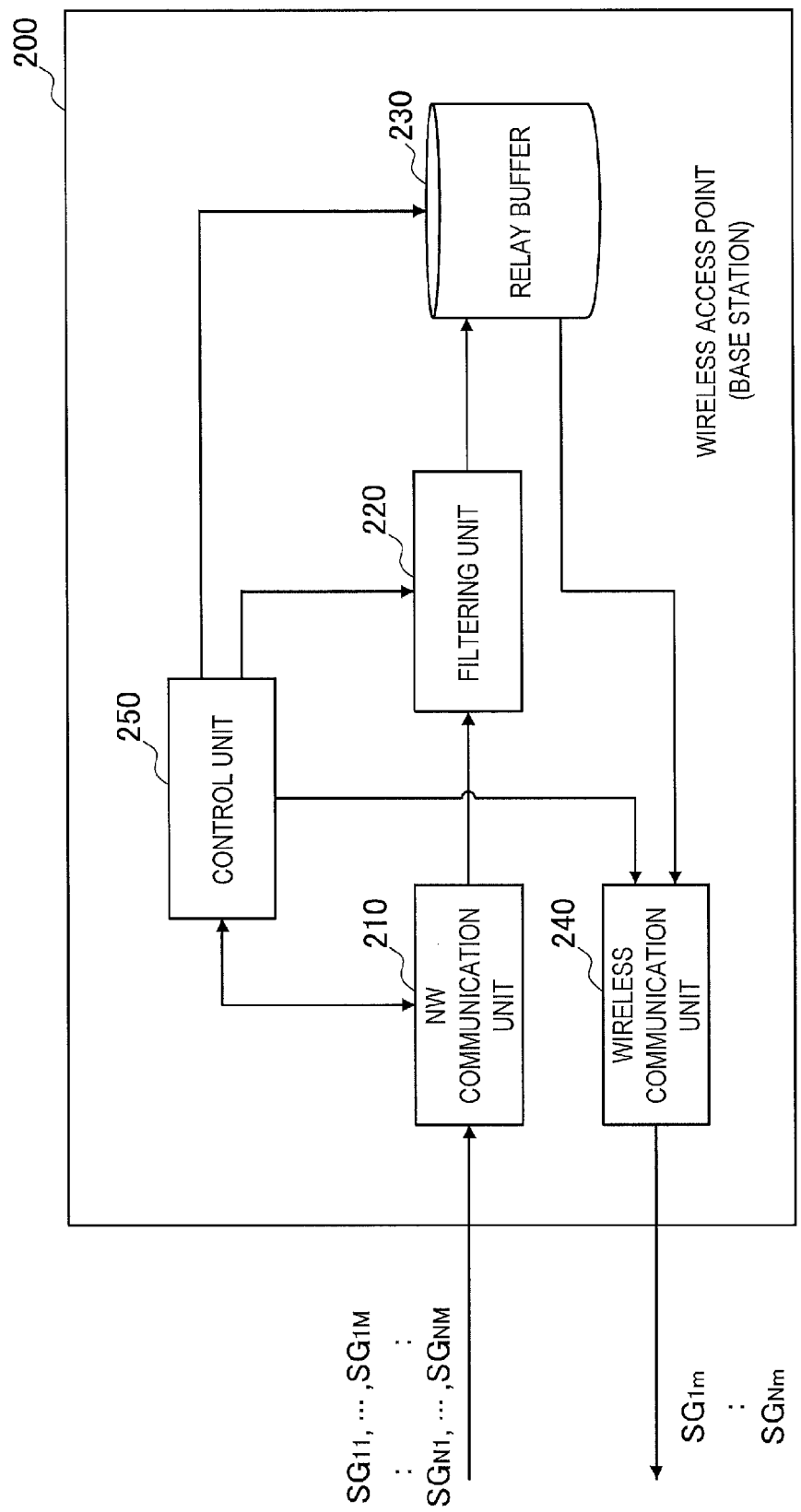
FIG. 8 is a block diagram illustrating an exemplary configuration of a wireless access point according to an embodiment.

FIG. 8 is a block diagram illustrating an exemplary configuration of the wireless AP 200 according to an embodiment. Referring to FIG. 8, the wireless AP 200 includes a network (NW) communication unit 210, a filtering unit 220, a relay buffer 230, a wireless communication unit 240, and a control unit 250.

(1) NW Communication Unit

The NW communication unit 210 is a communication interface through which the wireless AP 200 performs communication with another device via the network 14. The NW communication unit 210 may be a wired communication interface or may be a wireless communication interface. For example, the NW communication unit 210 receives segment data serving as data packets for conveying segments included in streaming data from the data delivery server 100. The NW communication unit 210 outputs the segment data received from the data delivery server 100 to the filtering unit 220.

Further, the NW communication unit 210 receives a control message transmitted from the data delivery server 100. For example, the control message of the data delivery server 100 may include an allocation message indicating a multicast address and a frequency channel allocated to the wireless AP 200. Further, the control message of the data delivery server 100 may include an instruction message for instructing disabling of the traffic notification message function. The NW communication unit 210 outputs the control message received from the data delivery server 100 to the control unit 250.

(2) Filtering Unit

The filtering unit 220 is a module having an IP address filtering function. The filtering unit 220 filters the segment data received by the NW communication unit 210 based on the destination IP address in the header. The IP address of the segment data to be provided for a subsequent process is set by the control unit 250 which will be described later. For example, when the destination IP address of the segment data is identical to the multicast address allocated to the wireless AP 200, the filtering unit 220 stores the segment data in the relay buffer 230. On the other hand, when the destination IP address of the segment data is not identical to the multicast address allocated to the wireless AP 200, the filtering unit 220 may discard the segment data.

(3) Relay Buffer

The relay buffer 230 buffers the segment data input from the filtering unit 220. The segment data buffered by the relay buffer 230 may be deleted after the segment data is transmitted from the wireless communication unit 240.

(4) Wireless Communication Unit

The wireless communication unit 240 is a wireless communication interface through which the wireless AP 200 performs wireless communication with one or more terminal devices in the cell. In the present embodiment, the wireless communication unit 240 operates according to the wireless LAN scheme such as IEEE 802.11a, 11b, 11g, or 11n. The present disclosure is not limited to this example, and the wireless communication unit 240 may operate according to any other type of wireless communication scheme.

When the segment data conveying each segment included in the streaming data is stored in the relay buffer 230, the wireless communication unit 240 reads the segment data from the relay buffer 230, and delivers the read segment data to the terminal device 300 in the cell of the wireless AP 200.

(5) Control Unit

The control unit 250 controls wireless communication performed by the wireless AP 200. The control unit 250 sets an operation of the wireless AP 200 according to an initial setting instruction received from the data delivery server 100. For example, the control unit 250 sets the IP address that passes through or is blocked by the filtering unit 220 so that a packet having a multicast address allocated by the data delivery server 100 as the destination IP address is relayed. The control unit 250 sets a frequency channel to be used by the wireless communication unit 240 as a frequency channel instructed from the data delivery server 100. The control unit 250 disables the traffic notification message function for the terminal device 300 that receives the streaming data.

Further, the control unit 250 causes the segment data that is received by the NW communication unit 210 and buffered in the relay buffer 230 to be delivered from the wireless communication unit 240 to the terminal device 300 in the cell. As described above, the segment data to be relayed by the wireless AP 200 is received in a certain time slot in each time window. The time slot is a slot different from the time slot in which the segment data is delivered by another wireless AP 200 using the same frequency channel in the neighboring cell. When the segment data is received, the control unit 250 causes the segment data to be delivered from the wireless communication unit 240 to the terminal device 300 immediately as long as permitted by a wireless link condition. As a result, the segment data is delivered to the terminal device 300 on the wireless link in the same slot as the time slot in which the segment data is received from the data delivery server 100 (or at least within an immediately subsequent guard interval when there is a slight delay).

Further, the control unit 250 adds an identifier (for example, "WiFi-Vision" or the like) commonly defined in the data delivery system 10 to each piece of the segment data transmitted from the wireless communication unit 240. In the OBSS environment of the wireless LAN, the identifier may be an SSID. The identifier may be used by the terminal device 300 in order to detect the segment data being streamed in the data delivery system 10.

[3-2. Process Flow]

Figure 9:
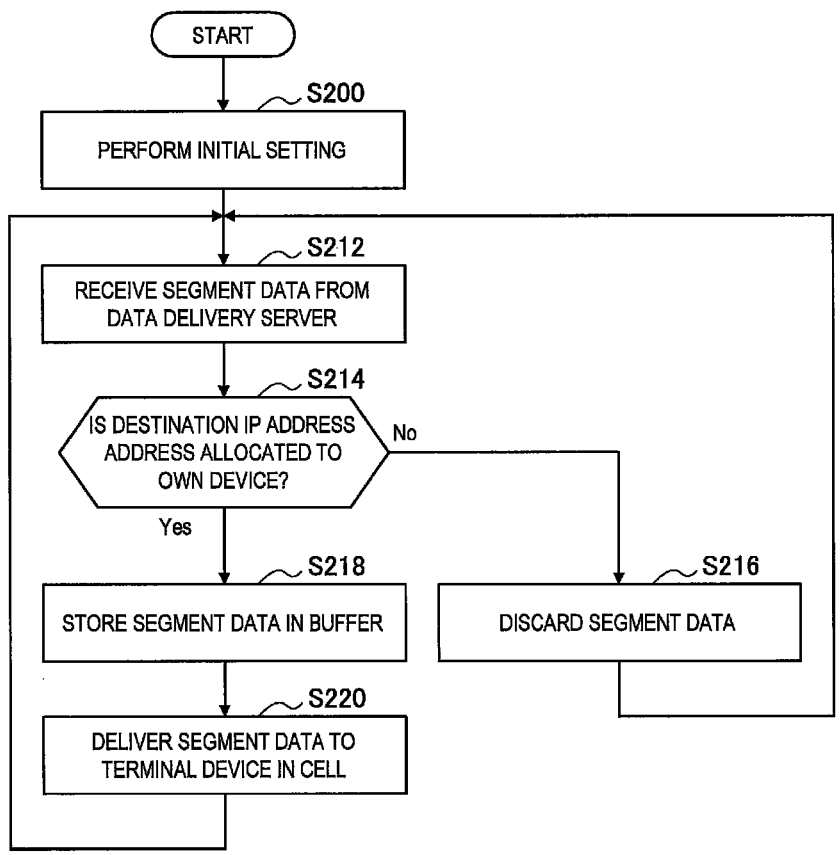
FIG. 9 is a flowchart illustrating an example of the flow of a data relay process.

FIG. 9 is a flowchart illustrating an example of the flow of the data relay process. Referring to FIG. 9, first, the control unit 250 performs an initial setting according to the initial setting instruction received from the data delivery server 100 (step S200). The initial setting performed herein may include a setting of IP address filtering in the filtering unit 220, a setting of a frequency channel to be used by the wireless communication unit 240, and a setting of the traffic notification message function for the individual terminal device 300.

Then, when the segment data conveying the segments of the streaming data is received by the NW communication unit 210 (step S212), the filtering unit 220 performs the IP address filtering based on the destination IP address in the header of the received segment data (step S214). For example, when the destination IP address is not identical to the multicast address to its own device, the filtering unit 220 discards the received segment data (step S216). On the other hand, when the destination IP address is not identical to the multicast address to its own device, the filtering unit 220 stores the received segment data in the relay buffer 230 (step S218).

Then, the wireless communication unit 240 reads the segment data stored in the relay buffer 230 according to control by the control unit 250, and delivers the read segment data to the terminal device 300 in the cell of the wireless AP 200 (step S220). Thereafter, the process returns to step S212, and the wireless AP 200 is on standby for reception of next segment data.

Further, when segment data of a plurality of pieces of streaming data is received within one time slot, the wireless AP 200 may relay the segment data sequentially. The wireless AP 200 may relay the segment data without recognizing whether the segment data to be relayed is data of the main stream or data of the sub stream.

4. EXEMPLARY CONFIGURATION OF TERMINAL DEVICE

[4-1. Configuration of Device]

Figure 10:
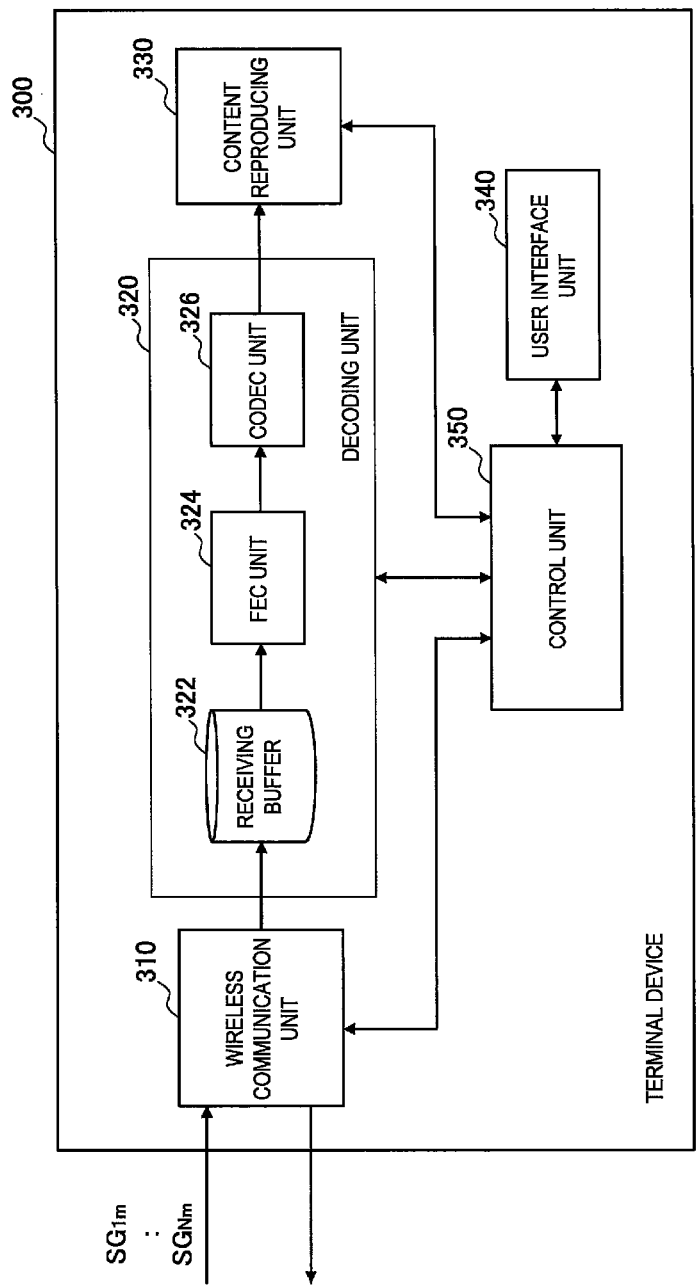
FIG. 10 is a block diagram illustrating an exemplary configuration of a terminal device according to an embodiment.

FIG. 10 is a block diagram illustrating an exemplary configuration of the terminal device 300 according to an embodiment. Referring to FIG. 10, the terminal device 300 includes a wireless communication unit 310, a decoding unit 320, a content reproducing unit 330, a user interface unit 340, and a control unit 350.

(1) Wireless Communication Unit

The wireless communication unit 310 is a wireless communication interface through which the terminal device 300 performs wireless communication with the wireless AP 200 at an adjacent position. In the present embodiment, the wireless communication unit 310 operates according to the wireless LAN scheme such as IEEE 802.11a, 11b, 11g, or 11n. The present disclosure is not limited to this example, and the wireless communication unit 310 may operate according to any other type of wireless communication scheme.

When the user desires to receive and reproduce the streaming data delivered in the data delivery system 10, the wireless communication unit 310 attempts to receive the segment data serving as a data packet to which a certain identifier is added (for example, as an SSID) according to control by the control unit 350 which will be described later.

When a plurality of identifier candidates are detected, the identifier of the segment data to be received may be designated for each user. Upon receiving the segment data, the wireless communication unit 310 outputs the received segment data to the decoding unit 320.

As described above, in a certain cell, the segment data conveying each segment included in the streaming data is received from the wireless AP 200 operating the cell in a certain time slot in each time window or a guard interval immediately subsequent to the time slot. No segment data is received from another wireless AP 200 using the same frequency channel in a neighboring cell in this time slot. Thus, the wireless communication unit 310 can stably receive the segment data with high quality without experiencing the inter-cell interference. No segment data is received in another time slot in the same time window.

(2) Decoding Unit

The decoding unit 320 includes a receiving buffer 322, a forward error correction (FEC) unit 324, and a codec unit 326. The receiving buffer 322 buffers the segment data input from the wireless communication unit 310. When AL-FEC is applied to the segment data at a transmission side, the FEC unit 324 verifies whether or not there is an error in the segment data buffered by the receiving buffer 322. Then, when an error is detected, the FEC unit 324 corrects the detected error. The codec unit 326 sequentially decodes streaming content from the segment in the segment data transferred from the FEC unit 324.

(3) Content Reproducing Unit

The content reproducing unit 330 reproduces video content decoded by the decoding unit 320 using a display (not illustrated). The content reproducing unit 330 reproduces audio content decoded by the decoding unit 320 using a speaker (not illustrated). The user may designate a service whose content is to be reduced among N content services.

(4) User Interface Unit

The user interface unit 340 provides the user with the user interface for operating the terminal device 300 or inputting information to the terminal device 300. For example, the user interface unit 340 may include an input device such as a touch panel, a button, a switch, a keypad, a keyboard, or a pointing device. Further, the user interface unit 340 may include an audio input interface such as a microphone.

For example, the user interface unit 340 may be used when the user designates the identifier of the segment data to be received or the user designates content (or a service) to be reproduced.

(5) Control Unit

The control unit 350 controls general operations of the terminal device 300. For example, when the user desires to reproduce content being streamed in the data delivery system 10, the control unit 350 causes the wireless communication unit 310 to receive the segment data serving as a data packet having a desired identifier added thereto. For example, the destination IP address of the segment data is any one multicast address (for example, "239.192.50.X" or the like) within a previously defined range. The control unit 350 may listen to the multicast address within the range and recognize that the detected multicast address is the multicast address allocated to the wireless AP 200 of the connection destination. When segment data having a plurality of destination port numbers that is addressed to the same multicast address is received, the control unit 350 may recognize that the segment data is data for a plurality of reproducible streaming data. In this case, the control unit 350 may allow the user to select content (or a service) to be reproduced through the user interface unit 340.

The control unit 350 causes the decoding unit 320 to decode content from the segment included in the received segment data, and causes the content reproducing unit 330 to reproduce the decoded content. Further, when the terminal device 300 has moved from a cell to which the wireless communication unit 310 is connected until that time to a neighboring cell, the control unit 350 performs the handover (or roaming) procedure, and switches the connection destination access point of the wireless communication unit 310 to the wireless AP 200 of the neighboring cell.

The segment data conveying each segment is delivered from the wireless AP 200 near the terminal device 300 in a specific time slot in a certain delivery period. The control unit 350 recognizes the segment delivery period received by the wireless communication unit 310. For example, the control unit 350 may recognize the segment delivery period based on the time stamp added to the header of the segment data received by the wireless communication unit 310. For example, the segment delivery period is equal to an interval between the time stamps of the two pieces of segment data that have the same destination port number and are consecutively received. When the redundant segment delivery is not performed, the delivery period corresponds to the length of one time window. Further, the control unit 350 may cause the wireless communication unit 310 to sleep at least partially in other time slots in which no segment data is received from the wireless AP 200 based on the recognized delivery period. Thus, it is possible to reduce power consumption for receiving the streaming data. The control unit 350 may perform an additional process such as measurement of signal quality of a neighboring cell or detection of another SSID in a non-active period of time in which no segment data is received.

The control unit 350 may disable the traffic notification message function (for example, a DTIM function in the wireless LAN scheme) from the wireless AP 200 of the connection destination in advance. Thus, since no message exchange is performed between the wireless AP 200 and the terminal device 300 before the segment data is delivered, it is possible to secure periodic delivery of segment data with a low delay.

When the segments of the main stream and the sub stream are redundantly delivered, the segment delivery period may correspond to the length of the two time windows. For example, the control unit 350 may compare the destination port numbers of the segment data and recognize whether the received segment data is data of the main stream or data of the sub stream. A common rule between the port numbers of the main stream and the sub stream may be defined in advance (for example, a difference between the port numbers is 100). For example, in normal circumstances, the control unit 350 may cause the wireless communication unit 310 to regularly receive the segment data of the main stream and cause the wireless communication unit 310 to sleep in the time slot in which the segment data of the main stream is not received.

Further, the wireless AP 200 may control an active period of time of the terminal device 300 actively using the DTIM mechanism while snooping an IGMP join message from the terminal device 300.

A time difference between the time slot in which the segment of the main stream is delivered and the time slot in which the same segment of the sub stream is delivered is decided based on a period of time taken for the inter-cell handover so that an opportunity to receive each of a series of segments of the streaming data is not lost regardless of the time at which the handover is performed. After the handover is performed, when the segment data of the main stream has not been received in a new cell, the control unit 350 causes the wireless communication unit 310 to receive the segment data of the sub stream delivered within a subsequent time window. As a result, it is possible to prevent segment loss caused by the handover and implement seamless reproduction of streaming content. The control unit 350 can recognize whether or not segment loss has occurred by verifying the interval between the time stamps of the segment data. After causing the wireless communication unit 310 to receive the segment of the sub stream, the control unit 350 may switch a slot for receiving a subsequent segment to the time slot in which the segment of the main stream is delivered regardless of a sleep period of time. As a result, it is possible to secure more time to perform the handover for a next handover in advance without segment loss.

Further, when an attempt to access the data delivery system 10 is made for the first time or when a service to be reproduced is newly selected, the control unit 350 may start decoding content from the segment data of the sub stream if the segment data of the sub stream is detected before the segment data of the main stream is detected. Thus, it is possible to reduce a standby time until reproduction of content starts.

Further, the control unit 350 may cause the wireless communication unit 310 to receive both the segment data of the main stream and the segment data of the sub stream and then cause content to be decoded from the segment data of the stream showing the better reception quality. Thus, it is possible to obtain a diversity gain and implement reproduction of high-quality content. Further, when the terminal device 300 is positioned near the cell edge, the control unit 350 may receive the delivered segment data from a plurality of wireless APs 200 for the same segment and cause content to be decoded from the segment data delivered from the wireless AP 200 showing the better reception quality. In this case, the control unit 350 may cause the wireless communication unit 310 to switch the access point of the connection destination in the guard interval.

[4-2. Process Flow]

In this section, an example of the flow of the data reception process performed by the terminal device 300 will be described.

(1) First Example

Figure 11A:
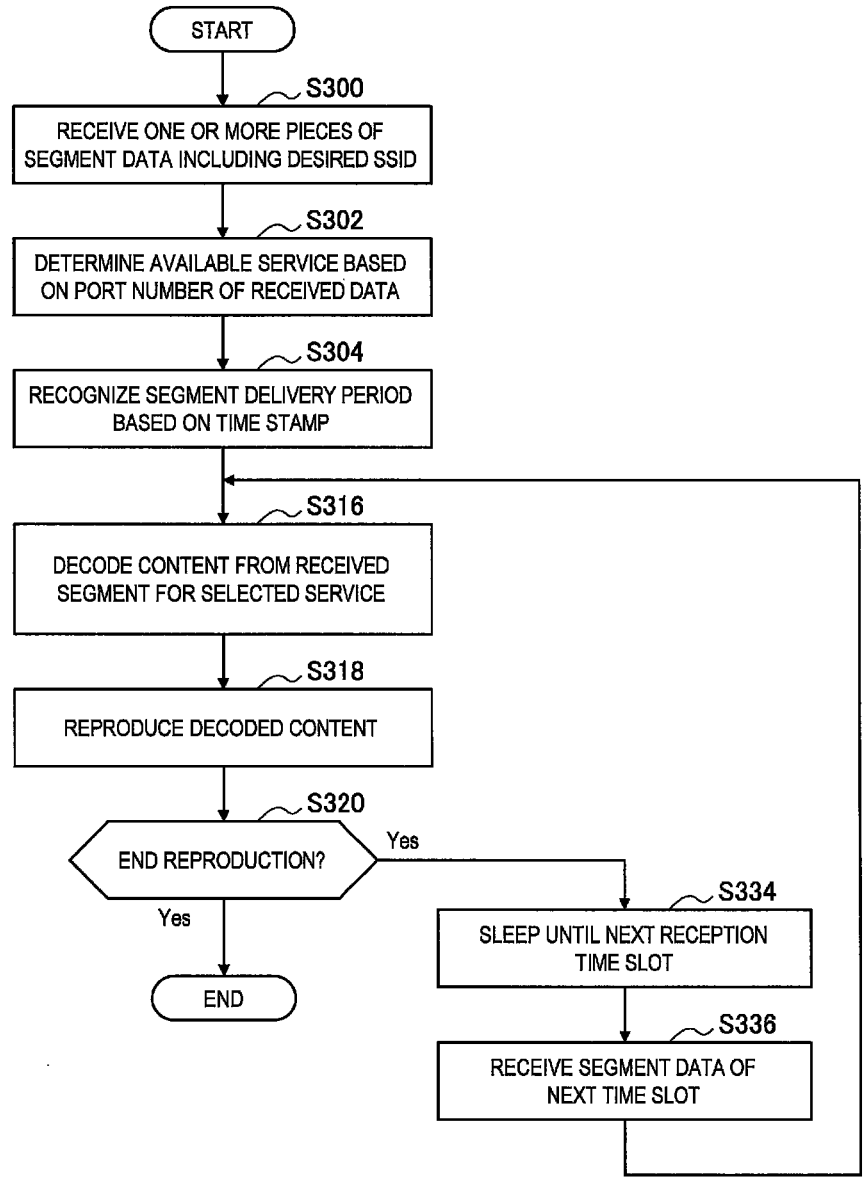
FIG. 11A is a flowchart illustrating a first example of the flow of a data reception process.

FIG. 11A is a flowchart illustrating a first example of the flow of the data reception process performed by the terminal device 300. In the first example, the redundant segment delivery is not performed.

Referring to FIG. 11A, first, the wireless communication unit 310 receives one or more pieces of segment data including a desired SSID from the wireless AP 200 of the connection destination (step S300). Then, the control unit 350 determines an available content service based on the port number of the data received by the wireless communication unit 310 (step S302). Here, when a plurality of content services (or a plurality of pieces of streaming data) are provided, the user may select content to be reproduced. Further, the control unit 350 recognizes the segment delivery period based on the time stamp of the data received by the wireless communication unit 310 (step S304).

Then, the decoding unit 320 decodes content from the segment received by the wireless communication unit 310 for the selected service (step S316). Then, the content reproducing unit 330 reproduces the content decoded by the decoding unit 320 (step S318).

Then, the control unit 350 determines whether or not the reproduction of the streaming data is to be ended (step S320). When the reproduction of the streaming data is not to be ended, the control unit 350 causes the wireless communication unit 310 to sleep until the next reception time slot (step S334). Here, the next reception time slot may be a slot at the same position as the time slot of a next time window in which the latest segment data has been received. Then, when the next reception time slot comes, the control unit 350 ends the sleeping of the wireless communication unit 310, and causes the wireless communication unit 310 to receive the segment data in the corresponding time slot (step S336).

Thereafter, the process returns to step S314, and decoding and reproducing of content from a newly received segment may be repeated.

(2) Second Example

Figure 11B:
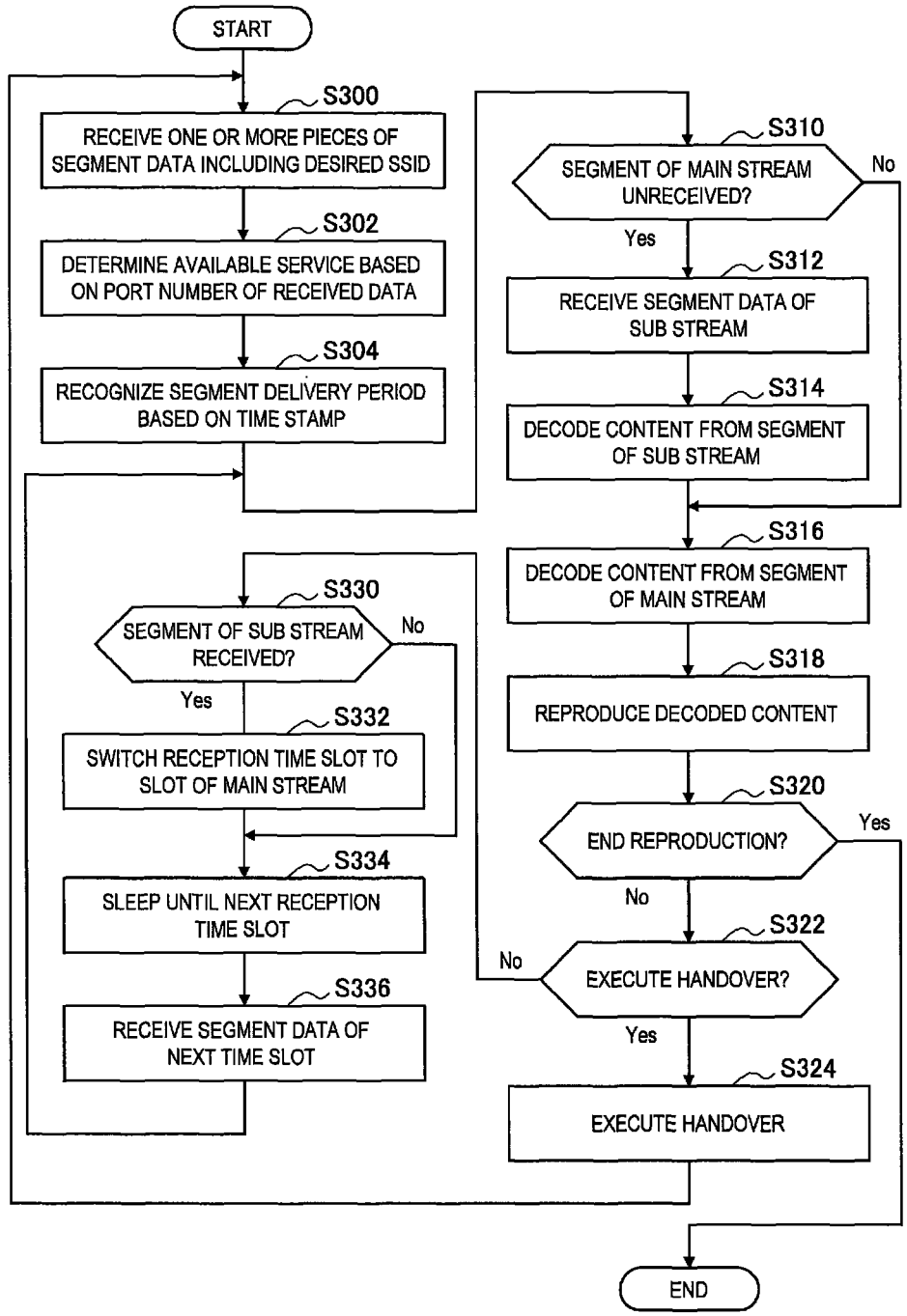
FIG. 11B is a flowchart illustrating a second example of the flow of the data reception process.

FIG. 11B is a flowchart illustrating a second example of the flow of the data reception process performed by the terminal device 300. In the second example, the redundant segment delivery is performed.

Referring to FIG. 11B, first, the wireless communication unit 310 receives one or more pieces of segment data including a desired SSID from the wireless AP 200 of the connection destination (step S300). Then, the control unit 350 determines an available content service based on the port number of the data received by the wireless communication unit 310 (step S302). Here, when a plurality of content services (or a plurality of pieces of streaming data) are provided, the user may select content to be reproduced. Further, the control unit 350 may recognize that the segment of the main stream and the segment of the sub stream are being redundantly delivered based on the port number of the received data. Furthermore, the control unit 350 recognizes the segment delivery period based on the time stamp of the data received by the wireless communication unit 310 (step S304).

Thereafter, the control unit 350 causes the wireless communication unit 310 to receive the segment data of the main stream in principle. Here, when the segment data of the main stream has not been received (step S310), the control unit 350 causes the wireless communication unit 310 to receive the segment data of the sub stream for the same segment (step S312). Then, the decoding unit 320 decodes content from the received segment of the sub stream for the selected service (step S314). On the other hand, when the segment data of the main stream has been successfully received, the decoding unit 320 decodes content from the received segment of the main stream for the selected service (step S316). Then, the content reproducing unit 330 reproduces the content decoded by the decoding unit 320 (step S318).

Then, the control unit 350 determines whether or not the reproduction of the streaming data is to be ended (step S320). When the reproduction of the streaming data is not to be ended, the control unit 350 further determines whether or not the handover has to be executed (step S322). For example, when the signal reception quality measured in the cell of the connection destination is bad, the control unit 350 may determine that the handover has to be executed. When the handover has to be executed, the control unit 350 causes the wireless communication unit 310 to have access to a new cell by executing the handover (step S324). Then, the process returns to step S300. On the other hand, when the handover is determined not to be executed, the process proceeds to step S330.

In step S330, the control unit 350 determines whether or not the previously received segment data is the segment data of the sub stream (step S330). When the previously received segment data is the segment data of the sub stream, the control unit 350 switches the next reception time slot to the time slot for the main stream regardless of the segment delivery period (step S332).

Thereafter, the control unit 350 causes the wireless communication unit 310 to sleep until the next reception time slot (step S334). Here, the next reception time slot may be the time slot for the next main stream. Then, when the next reception time slot comes, the control unit 350 ends the sleeping of the wireless communication unit 310, and causes the wireless communication unit 310 to receive the segment data in the corresponding time slot (step S336).

Thereafter, the process returns to step S310, and decoding and reproducing of content from a newly received segment may be repeated.

5. MODIFIED EXAMPLE

In the above embodiment, a configuration of a time slot is planned in advance according to an arrangement of the wireless APs 200 in the system. Further, the slot configuration data defining the configuration of the decided time slot is stored in the slot configuration DB 150 of the data delivery server 100. In a modified example described in this section, the configuration of the time slot can be dynamically planned according to an arrangement of the wireless APs 200 an arrangement of the wireless APs 200 in the system.

Figure 12:
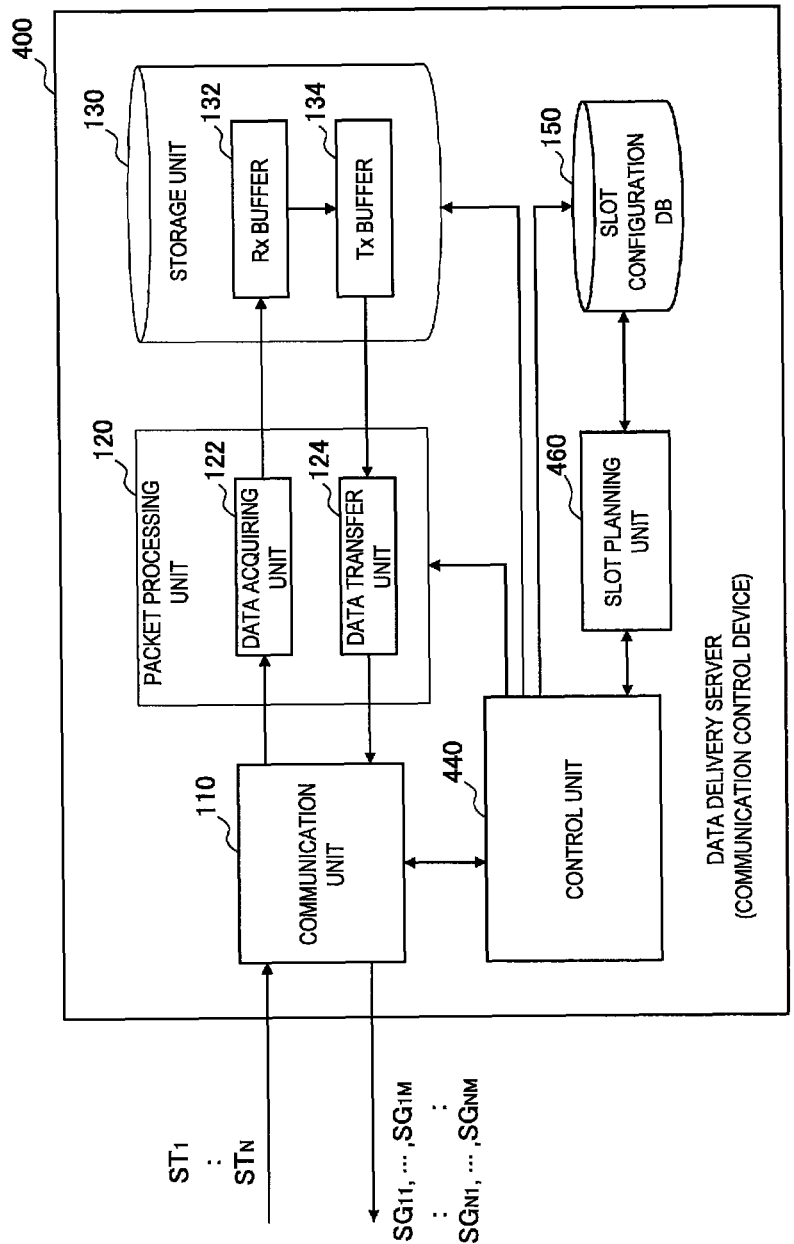
FIG. 12 is a block diagram illustrating an exemplary configuration of a data delivery server according to a modified example.

FIG. 12 is a block diagram illustrating an exemplary configuration of a data delivery server 400 according to a modified example. Referring to FIG. 12, the data delivery server 400 includes a communication unit 110, a data processing unit 120, a storage unit 130, a control unit 440, a slot configuration DB 150, and a slot planning unit 460.

Similarly to the control unit 140 of the data delivery server 100, the control unit 440 controls the data transfer unit 124 such that the segments of the streaming data are transferred to a plurality of wireless APs 200 that use the same frequency channel and includes cells overlapping each other in different time slots. Here, in the present modified example, the control unit 440 controls the delivery of the streaming data by the data delivery server 400 according to the slot configuration planned by the slot planning unit 460. For example, the control unit 440 collects arrangement information (hereinafter referred to as "AP arrangement information") of the wireless APs 200 in the system involved in streaming from the wireless APs 200 according to an instruction from the user or periodically. For example, the AP arrangement information may be information indicating the positions of the wireless APs 200 and the coverage (the radius or the like) of the cell. Further, when an arrangement of one or more wireless APs 200 has been changed, the control unit 440 requests the slot planning unit 460 to plan (re-plan) the configuration of the time slot.

The slot planning unit 460 plans the configuration of the time slot based on the AP arrangement information provided from the control unit 440. For example, the slot planning unit 460 may decide the number of time slots in each time window depending on the number of access points that include cells overlapping each other and use the same frequency channel. More specifically, the slot planning unit 460 determines the number C of overlapping cells at a position at which the largest number of cells overlap in the service area based on the AP arrangement information. Further, the slot planning unit 460 determines the number F of available frequency channels. When the number C of overlapping cells is larger than the number F of available frequency channels, there is a situation in which the same frequency channel has to be used in cells overlapping each other. In this case, for example, the slot planning unit 460 sets the smallest integer M that does not fall below C/F as the number of time slots in one time window. When F is 1, M may be equal to C. Further, the slot planning unit 460 prepares M multicast addresses, and allocates different multicast addresses to the wireless APs 200 including cells overlapping each other. The number of colors corresponds to the product of the number M of time slots and the number F of frequency channels. Further, the slot planning unit 460 generates the slot configuration data defining mapping of a time slot, a multicast address, and a frequency channel for each color as illustrated in FIGS. 3A and 3B, and causes the generated slot configuration data to be stored in the slot configuration DB 150. The control unit 440 controls transfer of the streaming data by the data delivery server 400 according to the slot configuration data generated by the slot planning unit 460. Further, the control unit 440 may identify the number N of streaming data to be provided in parallel and further divide each time slot into N sub slots.

6. CONCLUSION

Embodiments of the technology according to the present disclosure have been described above in detail with reference to FIGS. 1 to 12. According to the above embodiments, segments included in the streaming data to be delivered to one or more terminal devices in a service area including a plurality of overlapping cells are delivered from wireless access points including cells overlapping each other in different time slots. Thus, it is possible to prevent interference of streaming data in an area in which cells overlap in a situation in which it is difficult to use different frequency channels in overlapping cells. Thus, the terminal device can stably receive the streaming data. Further, the above-described mechanism does not require a complicated implementation such as retransmission control or collaborative interference control defined in IEEE 802.11aa and the eMBMS technique standardized by the 3GPP. Thus, it is possible to implement the mechanism for stable streaming at a relatively low implementation cost.

Further, according to the above embodiments, a plurality of time slots for delivering segments from different wireless access points are arranged in one time window, and the number of time slots in each time window is decided depending on the number of wireless access points that include cells overlapping each other and use the same frequency channel. Thus, regardless of how the wireless access points are arranged in the service area, it is possible to deliver the segments in a time division manner without interference of wireless signals of the streaming data in an area in which cells overlap. The mechanism has an advantage in that it can be applied, for example, even when a system is constructed using existing cells rather than cells that are arranged by design in advance.

Further, according to the above embodiments, different multicast addresses may be added to segment data packets that are addressed to wireless access points that deliver the same segment in different time slots, and then the packets may be transmitted. According to this configuration, it is possible to implement the above-described mechanism at a small implementation cost based on the IP address filtering function that is already provided in many existing wireless access points. For the wireless access point, only a setting of the IP address filtering function has to be added, and it is unnecessary to develop a new function. Further, since the delivery of the streaming data is controlled in the Internet Protocol (IP) layer or an upper layer higher than the IP layer, it is possible to configure the terminal device to support the mechanism easily, for example, by installing a light application module.

Further, according to the above embodiments, the terminal device may recognize the segment delivery period of the streaming data and then cause the wireless communication function to sleep at least partially in the time slot in which no segment is received from the wireless access point. Thus, it is possible to reduce the power consumption of the terminal device.

Further, according to an embodiment, the same segment of the streaming data is redundantly delivered from the wireless access point in the time slots of the two different time windows. In this case, although reception of a segment that is delivered first fails, the terminal device can receive a segment that is delivered later, acquire a series of segments of the streaming data without loss, and decode content. Thus, for example, it is possible to secure streaming continuity and implement seamless content reproduction even in a situation in which the terminal device performs the handover between cells at a high speed.

Further, a series of control processes by the respective devices described in this specification may be implemented using any one of software, hardware, and a combination of hardware and software. For example, a program configuring software is stored in a storage medium (a non-transitory medium) installed inside or outside each device. Further, for example, each program is read onto a Random Access Memory (RAM) at the time of execution and executed by a processor such as a Central Processing Unit (CPU).

Further, the processes described using the flowcharts in this specification may not necessarily be executed in the order indicated by the flowchart. Some process steps may be executed in parallel. Further, additional process steps may be employed, and some process steps may be omitted.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)
A communication control device including:
a control unit configured to cause each of segments included in streaming data to be delivered to one or more terminal devices in an area including a plurality of overlapping cells to be delivered from a first access point of a first cell in a first time slot and to be delivered from a second access point of a second cell overlapping the first cell in a second time slot different from the first time slot.

(2)
The communication control device according to (1),
wherein the control unit refrains from causing data to be delivered from the first access point in the second time slot and refrains from causing data to be delivered from the second access point in the first time slot.

(3)
The communication control device according to (1) or (2),
wherein the control unit arranges a plurality of time slots for delivering segments from different access points within one time window, and
wherein a number of time slots in each time window is decided depending on a number of access points that include cells overlapping each other and use a same frequency channel.

(4)
The communication control device according to any one of (1) to (3),
wherein each access point includes an IP address filtering function, and
wherein the control unit allocates a same multicast address to packets for transferring segments to access points that deliver a same segment in a same time slot, and allocates different multicast addresses to packets for transferring segments to access points that deliver a same segment in different time slots.

(5)
The communication control device according to any one of (1) to (4),
wherein the control unit causes the access points to disable, in advance, a traffic notification message function for a terminal device that receives the streaming data.

(6)
The communication control device according to any one of (1) to (5), further including:
a transfer unit configured to add a time stamp for causing a terminal device to recognize a segment delivery period to each segment to be transferred to each access point.

(7)
The communication control device according to any one of (1) to (6),
wherein the first time slot is included in a first time window, and
wherein the control unit causes the same segment as the segment delivered in the first time slot to be delivered from the first access point in a third time slot in a second time window different from the first time window.

(8)
The communication control device according to (7),
wherein a time difference between the first time slot and the third time slot is decided based on a period of time taken for an inter-cell handover.

(9)
The communication control device according to any one of (1) to (8),
wherein the access point is an access point of a wireless Local Area Network (LAN), and
wherein the plurality of cells configure Overlapping Basic Service Sets (OBSS).

(10)
A communication control method including:
causing each of segments included in streaming data to be delivered to one or more terminal devices in an area including a plurality of overlapping cells to be delivered from a first access point of a first cell in a first time slot; and
causing each of the segments to be delivered from a second access point of a second cell overlapping the first cell in a second time slot different from the first time slot.

(11)
A program causing a computer that controls a communication control device to operates as:
a control unit configured to cause each of segments included in streaming data to be delivered to one or more terminal devices in an area including a plurality of overlapping cells to be delivered from a first access point of a first cell in a first time slot and to be delivered from a second access point of a second cell overlapping the first cell in a second time slot different from the first time slot.

(12)

A terminal device including:

a wireless communication unit configured to receive each of segments included in streaming data from an access point in a first time slot in a time window including the first time slot and a second time slot; and a control unit configured to cause the wireless communication unit to sleep at least partially in the second time slot in which the segment is not received from the access point.

(13)

The terminal device according to (12), wherein the control unit recognizes a delivery period of the segment based on a time stamp added to the segment received by the wireless communication unit.

(14)

The terminal device according to (12) or (13), wherein each of the segments is redundantly transmitted in the first time slot and a third time slot later than the first time slot, and wherein, after performing a handover, when the segment delivered in the first time slot has not been received, the control unit causes the wireless communication unit to receive the same segment delivered in the third time slot.

(15)

The terminal device according to (14), wherein a time difference between the first time slot and the third time slot is decided based on a period of time taken for an inter-cell handover.

(16)

The terminal device according to (14) or (15), wherein after causing the wireless communication unit to receive the segment delivered in the third time slot, the control unit switches a slot for receiving a subsequent segment to the first time slot.

(17)

The terminal device according to any one of (14) to (16), wherein the control unit further causes the wireless communication unit to sleep at least partially in the first time slot or the third time slot.

(18)

A data receiving method including:

receiving, in a terminal device, each of segments included in streaming data from an access point in a first time slot in a time window including the first time slot and a second time slot; and causing a wireless communication unit of the terminal device to sleep at least partially in the second time slot in which the segment is not received from the access point.

(19)

A program causing a computer that controls a terminal device including a wireless communication unit to function as:

a control unit configured to cause the wireless communication unit to receive each of segments included in streaming data from an access point in a first time slot in a time window including the first time slot and a second time slot and cause the wireless communication unit to sleep at least partially in the second time slot in which the segment is not received from the access point.

(20)

An access point that provides a wireless communication service to a terminal device in a first cell, the access point including:

a wireless communication unit configured to deliver each of segments included in streaming data to the terminal device; and a control unit configured to cause the wireless communication unit to deliver each segment to the terminal device in a time slot different from a time slot in which each segment is delivered in a second cell overlapping the first cell.

REFERENCE SIGNS LIST 100, 400 data delivery server (communication control device)
110 communication unit
122 data acquiring unit
124 data transfer unit
140, 440 control unit
460 planning unit
200 wireless access point (base station)
210 network communication unit
220 filtering unit
240 wireless communication unit
250 control unit
300 terminal device
310 wireless communication unit
320 decoding unit
330 content reproducing unit
350 control unit

The invention claimed is:

1. A communication control device, comprising:

one or more processors configured to:

deliver each of segments included in streaming data to at least one terminal device in an area including a plurality of overlapping cells from a first access point of a first cell in a first time slot and from a second access point of a second cell that overlaps the first cell in a second time slot different from the first time slot, wherein each of the first access point and the second access point includes an Internet Protocol (IP) address filtering function;

allocate a same multicast address to packets to transfer segments to access points that deliver a same segment in a same time slot; and allocate different multicast addresses to packets to transfer segments to access points that deliver a same segment in different time slots.

2. The communication control device according to claim 1, wherein the one or more processors are further configured to refrain from delivery of first data from the first access point in the second time slot and refrain from delivery of second data from the second access point in the first time slot.

3. The communication control device according to claim 1, wherein the one or more processors are further configured to arrange a plurality of time slots to deliver segments from different access points within one time window, and wherein a number of time slots in each time window is determined based on a number of access points that include overlapping cells and utilize a same frequency channel.

4. The communication control device according to claim 1,
wherein the one or more processors are further configured to disable a traffic notification message function for a terminal device that receives the streaming data.

5. The communication control device according to claim 1,
wherein the one or more processors are further configured to add a time stamp to cause a terminal device to recognize a segment delivery period to each of the segments to be transferred to each of the first access point and the second access point.

6. The communication control device according to claim 1,
wherein the first time slot is included in a first time window, and
wherein the one or more processors are further configured to deliver the same segment as the segment delivered in the first time slot from the first access point in a third time slot in a second time window different from the first time window.

7. The communication control device according to claim 6,
wherein a time difference between the first time slot and the third time slot is determined based on a period of time taken for an inter-cell handover.

8. The communication control device according to claim 1,
wherein each of the first access point and the second access point is an access point of a wireless Local Area Network (LAN), and
wherein the plurality of overlapping cells configure Overlapping Basic Service Sets (OBSS).

9. A communication control method, comprising:
delivering each of segments included in streaming data to at least one terminal device in an area including a plurality of overlapping cells from a first access point of a first cell in a first time slot;
delivering each of the segments from a second access point of a second cell overlapping the first cell in a second time slot different from the first time slot,
wherein each of the first access point and the second access point includes an Internet Protocol (IP) address filtering function;
allocating a same multicast address to packets to transfer segments to access points that deliver a same segment in a same time slot; and
allocating different multicast addresses to packets to transfer segments to access points that deliver a same segment in different time slots.

10. A non-transitory computer-readable medium having stored thereon computer-readable instructions, which when executed by a computer, cause the computer to execute operations, the operations comprising:
delivering each of segments included in streaming data to at least one terminal device in an area including a plurality of overlapping cells from a first access point of a first cell in a first time slot and from a second access point of a second cell overlapping the first cell in a second time slot different from the first time slot,
wherein each of the first access point and the second access point includes an Internet Protocol (IP) address filtering function;
allocating a same multicast address to packets to transfer segments to access points that deliver a same segment in a same time slot; and
allocating different multicast addresses to packets to transfer segments to access points that deliver a same segment in different time slots.

11. A terminal device, comprising:
one or more processors configured to:
receive each of segments included in streaming data from an access point in a first time slot in a time window including the first time slot and a second time slot; and
cause a wireless communication unit of the terminal device to sleep at least partially in the second time slot based on a lack of reception of the segment from the access point,
wherein the access point includes an Internet Protocol (IP) address filtering function,
wherein a same multicast address is allocated to packets to transfer segments to access points that deliver a same segment in a same time slot, and
wherein different multicast addresses are allocated to packets to transfer segments to access points that deliver a same segment in different time slots.

12. The terminal device according to claim 11,
wherein the one or more processors are further configured to recognize a delivery period of a segment based on a time stamp added to the segment.

13. The terminal device according to claim 11,
wherein each of the segments is redundantly transmitted in the first time slot and a third time slot later than the first time slot, and
wherein, after execution of a handover, based on a lack of reception of the segment delivered in the first time slot, the one or more processors are further configured to receive the same segment delivered in the third time slot.

14. The terminal device according to claim 13,
wherein a time difference between the first time slot and the third time slot is determined based on a period of time taken for an inter-cell handover.

15. The terminal device according to claim 13,
wherein based on the reception of the segment delivered in the third time slot, the one or more processors are further configured to switch a slot to receive a subsequent segment to the first time slot.

16. The terminal device according to claim 13,
wherein the one or more processors are further configured to cause the wireless communication unit to sleep at least partially in one of the first time slot or the third time slot.

17. A data receiving method, comprising:
receiving, in a terminal device, each of segments included in streaming data from an access point in a first time slot in a time window including the first time slot and a second time slot; and
causing a wireless communication unit of the terminal device to sleep at least partially in the second time slot based on a lack of reception of the segment,
wherein the access point includes an Internet Protocol (IP) address filtering function,
wherein a same multicast address is allocated to packets to transfer segments to access points that deliver a same segment in a same time slot, and
wherein different multicast addresses are allocated to packets to transfer segments to access points that deliver a same segment in different time slots.

18. A non-transitory computer-readable medium having stored thereon computer-readable instructions, which when executed by a computer, cause the computer to execute operations, the operations comprising:

receiving each of segments included in streaming data from an access point in a first time slot in a time window including the first time slot and a second time slot; and causing a wireless communication unit of a terminal device to sleep at least partially in the second time slot based on a lack of reception of the segment from the access point, wherein the access point includes an Internet Protocol (IP) address filtering function, wherein a same multicast address is allocated to packets to transfer segments to a first set of access points that deliver a same segment in a same time slot, and wherein different multicast addresses are allocated to packets to transfer segments to a second set of access points that deliver a same segment in different time slots.

19. A method for communicating, comprising:

providing a wireless communication service to a terminal device in a first cell;

delivering each of segments included in streaming data to the terminal device; and delivering each segment to the terminal device in a first time slot different from a second time slot in which each segment is delivered in a second cell that overlaps the first cell, wherein an access point includes an Internet Protocol (IP) address filtering function, wherein a same multicast address is allocated to packets to transfer segments to access points that deliver a same segment in a same time slot, and wherein different multicast addresses are allocated to packets to transfer segments to access points that deliver a same segment in different time slots.

* * * * *